(12) United States Patent
Marcu (10) Patent No.: US 8,615,389 B1
(45) Date of Patent: Dec. 24, 2013

(54) GENERATION AND EXPLOITATION OF AN APPROXIMATE LANGUAGE MODEL

(75) Inventor: Daniel Marcu, Hermosa Beach, CA (US)

(73) Assignee: Language Weaver, Inc., Los Angeles, CA (US)

( * ) Notice: Subject to any disclaimer, the term of this patent is extended or adjusted under 35 U.S.C. 154(b) by 826 days.

(21) Appl. No.: 12/077,005

(22) Filed: Mar. 14, 2008

Related U.S. Application Data (60) Provisional application No. 60/918,435, filed on Mar. 16, 2007.

(51) Int. Cl.
*G06F 17/27* (2006.01)

(52) U.S. Cl.
USPC ...... 704/9; 704/1; 704/10; 707/706; 707/707; 707/708

(58) Field of Classification Search
USPC ................. 704/1–10; 707/698, 747
See application file for complete search history.

(56) References Cited

U.S. PATENT DOCUMENTS

| | | |
|---|---|---|
| 4,942,526 A | 7/1990 | Okajima et al. |
| 4,980,829 A | 12/1990 | Okajima et al. |
| 5,020,112 A | 5/1991 | Chou |
| 5,088,038 A | 2/1992 | Tanaka et al. |
| 5,091,876 A | 2/1992 | Kumano et al. |
| 5,146,405 A | 9/1992 | Church |
| 5,167,504 A | 12/1992 | Mann |
| 5,181,163 A | 1/1993 | Nakajima et al. |
| 5,212,730 A | 5/1993 | Wheatley et al. |
| 5,218,537 A | 6/1993 | Hemphill et al. |
| 5,220,503 A | 6/1993 | Suzuki et al. |
| 5,267,156 A | 11/1993 | Nomiyama |
| 5,268,839 A | 12/1993 | Kaji |
| 5,295,068 A | 3/1994 | Nishino et al. |
| 5,302,132 A | 4/1994 | Corder |
| 5,311,429 A | 5/1994 | Tominaga |
| 5,387,104 A | 2/1995 | Corder |
| 5,408,410 A | 4/1995 | Kaji |
| 5,432,948 A | 7/1995 | Davis et al. |
| 5,442,546 A | 8/1995 | Kaji et al. |

(Continued)

FOREIGN PATENT DOCUMENTS

| | | |
|---|---|---|
| EP | 0469884 | 2/1992 |
| EP | 0715265 | 6/1996 |

(Continued)

OTHER PUBLICATIONS

Cohen et al., Spectral Bloom Filters, SIGMOD 2003, Jun. 9-12, 2003, ACM pp. 241-252.*

(Continued)

*Primary Examiner* — Lamont Spooner
(74) *Attorney, Agent, or Firm* — Carr & Ferrell LLP (57) ABSTRACT

A system, method, and computer program for generating and exploiting an approximate language model are provided. The method comprises generating a language model according to an approximate hashing technique. The language model comprises a plurality of event sequences in a target language, and each member of the plurality of the event sequences is associated with at least one count. The language model is queried for a member of the plurality of event sequences. A probability associated with the member of the plurality of event sequences is determined based on results of the query.

20 Claims, 6 Drawing Sheets

(56) References Cited

U.S. PATENT DOCUMENTS

| | | |
|---|---|---|
| 5,477,450 A | 12/1995 | Takeda et al. |
| 5,477,451 A | 12/1995 | Brown et al. |
| 5,495,413 A | 2/1996 | Kutsumi et al. |
| 5,497,319 A | 3/1996 | Chong et al. |
| 5,510,981 A | 4/1996 | Berger et al. |
| 5,528,491 A | 6/1996 | Kuno et al. |
| 5,535,120 A | 7/1996 | Chong et al. |
| 5,541,836 A | 7/1996 | Church et al. |
| 5,541,837 A | 7/1996 | Fushimoto |
| 5,548,508 A | 8/1996 | Nagami |
| 5,644,774 A | 7/1997 | Fukumochi et al. |
| 5,675,815 A | 10/1997 | Yamauchi et al. |
| 5,687,383 A | 11/1997 | Nakayama et al. |
| 5,696,980 A | 12/1997 | Brew |
| 5,724,593 A | 3/1998 | Hargrave, III et al. |
| 5,752,052 A | 5/1998 | Richardson et al. |
| 5,754,972 A | 5/1998 | Baker et al. |
| 5,761,631 A | 6/1998 | Nasukawa |
| 5,761,689 A | 6/1998 | Rayson et al. |
| 5,768,603 A | 6/1998 | Brown et al. |
| 5,779,486 A | 7/1998 | Ho et al. |
| 5,781,884 A | 7/1998 | Pereira et al. |
| 5,794,178 A | 8/1998 | Caid et al. |
| 5,805,832 A | 9/1998 | Brown et al. |
| 5,806,032 A | 9/1998 | Sproat |
| 5,819,265 A | 10/1998 | Ravin et al. |
| 5,826,219 A | 10/1998 | Kutsumi |
| 5,826,220 A | 10/1998 | Takeda et al. |
| 5,845,143 A | 12/1998 | Yamauchi et al. |
| 5,848,385 A | 12/1998 | Poznanski et al. |
| 5,848,386 A | 12/1998 | Motoyama |
| 5,855,015 A | 12/1998 | Shoham |
| 5,864,788 A | 1/1999 | Kutsumi |
| 5,867,811 A | 2/1999 | O'Donoghue |
| 5,870,706 A | 2/1999 | Alshawi |
| 5,893,134 A | 4/1999 | O'Donoghue et al. |
| 5,903,858 A | 5/1999 | Saraki |
| 5,907,821 A | 5/1999 | Kaji et al. |
| 5,909,681 A | 6/1999 | Passera et al. |
| 5,930,746 A | 7/1999 | Ting |
| 5,966,685 A | 10/1999 | Flanagan et al. |
| 5,966,686 A | 10/1999 | Heidorn et al. |
| 5,983,169 A | 11/1999 | Kozma |
| 5,987,402 A | 11/1999 | Murata et al. |
| 5,987,404 A | 11/1999 | Della Pietra et al. |
| 5,991,710 A | 11/1999 | Papineni et al. |
| 5,995,922 A | 11/1999 | Penteroudakis et al. |
| 6,018,617 A | 1/2000 | Sweitzer et al. |
| 6,031,984 A | 2/2000 | Walser |
| 6,032,111 A | 2/2000 | Mohri |
| 6,047,252 A | 4/2000 | Kumano et al. |
| 6,064,819 A | 5/2000 | Franssen et al. |
| 6,064,951 A | 5/2000 | Park et al. |
| 6,073,143 A | 6/2000 | Nishikawa et al. |
| 6,077,085 A | 6/2000 | Parry et al. |
| 6,092,034 A | 7/2000 | McCarley et al. |
| 6,119,077 A | 9/2000 | Shinozaki |
| 6,131,082 A * | 10/2000 | Hargrave et al. ............ 704/7 |
| 6,161,082 A | 12/2000 | Goldberg et al. |
| 6,182,014 B1 | 1/2001 | Kenyon et al. |
| 6,182,027 B1 | 1/2001 | Nasukawa et al. |
| 6,205,456 B1 | 3/2001 | Nakao |
| 6,206,700 B1 | 3/2001 | Brown et al. |
| 6,223,150 B1 | 4/2001 | Duan et al. |
| 6,233,544 B1 * | 5/2001 | Alshawi ............................ 704/2 |
| 6,233,545 B1 | 5/2001 | Datig |
| 6,233,546 B1 | 5/2001 | Datig |
| 6,236,958 B1 | 5/2001 | Lange et al. |
| 6,269,351 B1 | 7/2001 | Black |
| 6,275,789 B1 | 8/2001 | Moser et al. |
| 6,278,967 B1 | 8/2001 | Akers et al. |
| 6,278,969 B1 | 8/2001 | King et al. |
| 6,285,978 B1 | 9/2001 | Bernth et al. |
| 6,289,302 B1 | 9/2001 | Kuo |
| 6,304,841 B1 | 10/2001 | Berger et al. |
| 6,311,152 B1 | 10/2001 | Bai et al. |
| 6,317,708 B1 | 11/2001 | Witbrock et al. |
| 6,327,568 B1 | 12/2001 | Joost |
| 6,330,529 B1 | 12/2001 | Ito |
| 6,330,530 B1 | 12/2001 | Horiguchi et al. |
| 6,356,864 B1 | 3/2002 | Foltz et al. |
| 6,360,196 B1 | 3/2002 | Poznanski et al. |
| 6,389,387 B1 | 5/2002 | Poznanski et al. |
| 6,393,388 B1 | 5/2002 | Franz et al. |
| 6,393,389 B1 | 5/2002 | Chanod et al. |
| 6,415,250 B1 | 7/2002 | van den Akker |
| 6,460,015 B1 | 10/2002 | Hetherington et al. |
| 6,470,306 B1 | 10/2002 | Pringle et al. |
| 6,473,729 B1 | 10/2002 | Gastaldo et al. |
| 6,480,698 B2 | 11/2002 | Ho et al. |
| 6,490,549 B1 | 12/2002 | Ulicny et al. |
| 6,498,921 B1 | 12/2002 | Ho et al. |
| 6,502,064 B1 | 12/2002 | Miyahira et al. |
| 6,529,865 B1 | 3/2003 | Duan et al. |
| 6,535,842 B1 | 3/2003 | Roche et al. |
| 6,587,844 B1 | 7/2003 | Mohri |
| 6,609,087 B1 | 8/2003 | Miller et al. |
| 6,647,364 B1 | 11/2003 | Yumura et al. |
| 6,691,279 B2 | 2/2004 | Yoden et al. |
| 6,745,161 B1 | 6/2004 | Arnold et al. |
| 6,745,176 B2 | 6/2004 | Probert et al. |
| 6,757,646 B2 | 6/2004 | Marchisio |
| 6,778,949 B2 | 8/2004 | Duan et al. |
| 6,782,356 B1 | 8/2004 | Lopke |
| 6,810,374 B2 | 10/2004 | Kang |
| 6,848,080 B1 | 1/2005 | Lee et al. |
| 6,857,022 B1 | 2/2005 | Scanlan |
| 6,885,985 B2 | 4/2005 | Hull |
| 6,901,361 B1 | 5/2005 | Portilla |
| 6,904,402 B1 | 6/2005 | Wang et al. |
| 6,952,665 B1 | 10/2005 | Shimomura et al. |
| 6,983,239 B1 | 1/2006 | Epstein |
| 6,996,518 B2 | 2/2006 | Jones et al. |
| 6,996,520 B2 | 2/2006 | Levin |
| 6,999,925 B2 | 2/2006 | Fischer et al. |
| 7,013,262 B2 | 3/2006 | Tokuda et al. |
| 7,016,827 B1 | 3/2006 | Ramaswamy et al. |
| 7,016,977 B1 | 3/2006 | Dunsmoir et al. |
| 7,024,351 B2 * | 4/2006 | Wang ............................... 704/9 |
| 7,031,911 B2 | 4/2006 | Zhou et al. |
| 7,050,964 B2 | 5/2006 | Menzes et al. |
| 7,085,708 B2 | 8/2006 | Manson |
| 7,089,493 B2 | 8/2006 | Hatori et al. |
| 7,103,531 B2 | 9/2006 | Moore |
| 7,107,204 B1 | 9/2006 | Liu et al. |
| 7,107,215 B2 | 9/2006 | Ghali |
| 7,113,903 B1 | 9/2006 | Riccardi et al. |
| 7,143,036 B2 | 11/2006 | Weise |
| 7,146,358 B1 | 12/2006 | Gravano et al. |
| 7,149,688 B2 | 12/2006 | Schalkwyk |
| 7,171,348 B2 | 1/2007 | Scanlan |
| 7,174,289 B2 | 2/2007 | Sukehiro |
| 7,177,792 B2 | 2/2007 | Knight et al. |
| 7,191,115 B2 | 3/2007 | Moore |
| 7,194,403 B2 | 3/2007 | Okura et al. |
| 7,197,451 B1 | 3/2007 | Carter et al. |
| 7,206,736 B2 | 4/2007 | Moore |
| 7,209,875 B2 | 4/2007 | Quirk et al. |
| 7,219,051 B2 | 5/2007 | Moore |
| 7,239,998 B2 | 7/2007 | Xun |
| 7,249,012 B2 | 7/2007 | Moore |
| 7,249,013 B2 | 7/2007 | Al-Onaizan et al. |
| 7,283,950 B2 | 10/2007 | Pournasseh et al. |
| 7,295,962 B2 | 11/2007 | Marcu |
| 7,302,392 B1 | 11/2007 | Thenthiruperai et al. |
| 7,319,949 B2 | 1/2008 | Pinkham |
| 7,340,388 B2 | 3/2008 | Soricut et al. |
| 7,346,487 B2 | 3/2008 | Li |
| 7,346,493 B2 | 3/2008 | Ringger et al. |
| 7,349,839 B2 | 3/2008 | Moore |
| 7,349,845 B2 | 3/2008 | Coffman et al. |
| 7,356,457 B2 | 4/2008 | Pinkham et al. |
| 7,369,998 B2 | 5/2008 | Sarich et al. |
| 7,373,291 B2 | 5/2008 | Garst |

(56) References Cited

U.S. PATENT DOCUMENTS

| | | | |
|---|---|---|---|
| 7,383,542 B2 | 6/2008 | Richardson et al. | |
| 7,389,222 B1 | 6/2008 | Langmead et al. | |
| 7,389,234 B2 | 6/2008 | Schmid et al. | |
| 7,403,890 B2 | 7/2008 | Roushar | |
| 7,409,332 B2 | 8/2008 | Moore | |
| 7,409,333 B2 | 8/2008 | Wilkinson et al. | |
| 7,447,623 B2 | 11/2008 | Appleby | |
| 7,454,326 B2 | 11/2008 | Marcu et al. | |
| 7,496,497 B2 | 2/2009 | Liu | |
| 7,533,013 B2 | 5/2009 | Marcu | |
| 7,536,295 B2 * | 5/2009 | Cancedda et al. | 704/4 |
| 7,546,235 B2 | 6/2009 | Brockett et al. | |
| 7,552,053 B2 | 6/2009 | Gao et al. | |
| 7,565,281 B2 | 7/2009 | Appleby | |
| 7,574,347 B2 * | 8/2009 | Wang | 704/7 |
| 7,580,830 B2 | 8/2009 | Al-Onaizan et al. | |
| 7,620,538 B2 | 11/2009 | Marcu et al. | |
| 7,620,632 B2 | 11/2009 | Andrews | |
| 7,624,005 B2 | 11/2009 | Koehn et al. | |
| 7,624,020 B2 | 11/2009 | Yamada et al. | |
| 7,627,479 B2 | 12/2009 | Travieso et al. | |
| 7,680,646 B2 | 3/2010 | Lux-Pogodalla et al. | |
| 7,689,405 B2 | 3/2010 | Marcu | |
| 7,698,124 B2 | 4/2010 | Menezes et al. | |
| 7,698,125 B2 | 4/2010 | Graehl et al. | |
| 7,707,025 B2 | 4/2010 | Whitelock | |
| 7,711,545 B2 | 5/2010 | Koehn | |
| 7,716,037 B2 | 5/2010 | Precoda et al. | |
| 7,813,918 B2 | 10/2010 | Muslea et al. | |
| 7,822,596 B2 | 10/2010 | Elgazzar et al. | |
| 7,925,494 B2 | 4/2011 | Cheng et al. | |
| 7,957,953 B2 | 6/2011 | Moore | |
| 7,974,833 B2 | 7/2011 | Soricut et al. | |
| 8,060,360 B2 | 11/2011 | He | |
| 8,145,472 B2 | 3/2012 | Shore et al. | |
| 8,214,196 B2 | 7/2012 | Yamada et al. | |
| 8,244,519 B2 | 8/2012 | Bicici et al. | |
| 2001/0009009 A1 | 7/2001 | Iizuka | |
| 2001/0029455 A1 | 10/2001 | Chin et al. | |
| 2002/0002451 A1 | 1/2002 | Sukehiro | |
| 2002/0013693 A1 | 1/2002 | Fuji | |
| 2002/0040292 A1 | 4/2002 | Marcu | |
| 2002/0046018 A1 | 4/2002 | Marcu et al. | |
| 2002/0046262 A1 | 4/2002 | Heilig et al. | |
| 2002/0059566 A1 * | 5/2002 | Delcambre et al. | 717/146 |
| 2002/0078091 A1 | 6/2002 | Vu et al. | |
| 2002/0087313 A1 * | 7/2002 | Lee et al. | 704/254 |
| 2002/0099744 A1 | 7/2002 | Coden et al. | |
| 2002/0111788 A1 | 8/2002 | Kimpara | |
| 2002/0111789 A1 | 8/2002 | Hull | |
| 2002/0111967 A1 | 8/2002 | Nagase | |
| 2002/0143537 A1 | 10/2002 | Ozawa et al. | |
| 2002/0152063 A1 | 10/2002 | Tokieda et al. | |
| 2002/0169592 A1 | 11/2002 | Aityan | |
| 2002/0188438 A1 | 12/2002 | Knight et al. | |
| 2002/0188439 A1 | 12/2002 | Marcu | |
| 2002/0198699 A1 | 12/2002 | Greene et al. | |
| 2002/0198701 A1 | 12/2002 | Moore | |
| 2002/0198713 A1 | 12/2002 | Franz et al. | |
| 2003/0009322 A1 | 1/2003 | Marcu | |
| 2003/0023423 A1 | 1/2003 | Yamada et al. | |
| 2003/0144832 A1 | 7/2003 | Harris | |
| 2003/0154071 A1 | 8/2003 | Shreve | |
| 2003/0158723 A1 | 8/2003 | Masuichi et al. | |
| 2003/0176995 A1 | 9/2003 | Sukehiro | |
| 2003/0182102 A1 | 9/2003 | Corston-Oliver et al. | |
| 2003/0191626 A1 | 10/2003 | Al-Onaizan et al. | |
| 2003/0204400 A1 | 10/2003 | Marcu et al. | |
| 2003/0216905 A1 | 11/2003 | Chelba et al. | |
| 2003/0217052 A1 | 11/2003 | Rubenczyk et al. | |
| 2003/0233222 A1 | 12/2003 | Soricut et al. | |
| 2004/0015342 A1 | 1/2004 | Garst | |
| 2004/0024581 A1 | 2/2004 | Koehn et al. | |
| 2004/0030551 A1 | 2/2004 | Marcu et al. | |
| 2004/0035055 A1 | 2/2004 | Zhu et al. | |
| 2004/0044530 A1 | 3/2004 | Moore | |
| 2004/0059708 A1 | 3/2004 | Dean et al. | |
| 2004/0068411 A1 | 4/2004 | Scanlan | |
| 2004/0098247 A1 | 5/2004 | Moore | |
| 2004/0102956 A1 | 5/2004 | Levin | |
| 2004/0102957 A1 | 5/2004 | Levin | |
| 2004/0111253 A1 | 6/2004 | Luo et al. | |
| 2004/0115597 A1 | 6/2004 | Butt | |
| 2004/0122656 A1 | 6/2004 | Abir | |
| 2004/0167768 A1 | 8/2004 | Travieso et al. | |
| 2004/0167784 A1 | 8/2004 | Travieso et al. | |
| 2004/0193401 A1 | 9/2004 | Ringger et al. | |
| 2004/0230418 A1 | 11/2004 | Kitamura | |
| 2004/0237044 A1 | 11/2004 | Travieso et al. | |
| 2004/0260532 A1 | 12/2004 | Richardson et al. | |
| 2005/0021322 A1 | 1/2005 | Richardson et al. | |
| 2005/0021517 A1 | 1/2005 | Marchisio | |
| 2005/0026131 A1 | 2/2005 | Elzinga et al. | |
| 2005/0033565 A1 | 2/2005 | Koehn | |
| 2005/0038643 A1 | 2/2005 | Koehn | |
| 2005/0055199 A1 * | 3/2005 | Ryzchachkin et al. | 704/4 |
| 2005/0060160 A1 | 3/2005 | Roh et al. | |
| 2005/0075858 A1 | 4/2005 | Pournasseh et al. | |
| 2005/0086226 A1 | 4/2005 | Krachman | |
| 2005/0102130 A1 | 5/2005 | Quirk et al. | |
| 2005/0125218 A1 | 6/2005 | Rajput et al. | |
| 2005/0149315 A1 | 7/2005 | Flanagan et al. | |
| 2005/0171757 A1 | 8/2005 | Appleby | |
| 2005/0204002 A1 | 9/2005 | Friend | |
| 2005/0228640 A1 | 10/2005 | Aue et al. | |
| 2005/0228642 A1 | 10/2005 | Mau et al. | |
| 2005/0228643 A1 | 10/2005 | Munteanu et al. | |
| 2005/0234701 A1 | 10/2005 | Graehl et al. | |
| 2005/0267738 A1 | 12/2005 | Wilkinson et al. | |
| 2006/0004563 A1 | 1/2006 | Campbell et al. | |
| 2006/0015320 A1 | 1/2006 | Och | |
| 2006/0015323 A1 | 1/2006 | Udupa et al. | |
| 2006/0018541 A1 | 1/2006 | Chelba et al. | |
| 2006/0020448 A1 | 1/2006 | Chelba et al. | |
| 2006/0041428 A1 * | 2/2006 | Fritsch et al. | 704/257 |
| 2006/0095248 A1 | 5/2006 | Menezes et al. | |
| 2006/0111891 A1 | 5/2006 | Menezes et al. | |
| 2006/0111892 A1 | 5/2006 | Menezes et al. | |
| 2006/0111896 A1 | 5/2006 | Menezes et al. | |
| 2006/0129424 A1 | 6/2006 | Chan | |
| 2006/0142995 A1 | 6/2006 | Knight et al. | |
| 2006/0150069 A1 | 7/2006 | Chang | |
| 2006/0167984 A1 | 7/2006 | Fellenstein et al. | |
| 2006/0190241 A1 | 8/2006 | Goutte et al. | |
| 2007/0016400 A1 | 1/2007 | Soricutt et al. | |
| 2007/0016401 A1 | 1/2007 | Ehsani et al. | |
| 2007/0033001 A1 | 2/2007 | Muslea et al. | |
| 2007/0050182 A1 | 3/2007 | Sneddon et al. | |
| 2007/0078654 A1 | 4/2007 | Moore | |
| 2007/0078845 A1 | 4/2007 | Scott et al. | |
| 2007/0083357 A1 | 4/2007 | Moore et al. | |
| 2007/0094169 A1 | 4/2007 | Yamada et al. | |
| 2007/0112553 A1 | 5/2007 | Jacobson | |
| 2007/0112555 A1 | 5/2007 | Lavi et al. | |
| 2007/0112556 A1 | 5/2007 | Lavi et al. | |
| 2007/0122792 A1 | 5/2007 | Galley et al. | |
| 2007/0168202 A1 | 7/2007 | Changela et al. | |
| 2007/0168450 A1 | 7/2007 | Prajapat et al. | |
| 2007/0180373 A1 | 8/2007 | Bauman et al. | |
| 2007/0219774 A1 | 9/2007 | Quirk et al. | |
| 2007/0250306 A1 | 10/2007 | Marcu et al. | |
| 2007/0265825 A1 | 11/2007 | Cancedda et al. | |
| 2007/0265826 A1 | 11/2007 | Chen et al. | |
| 2007/0269775 A1 | 11/2007 | Andreev et al. | |
| 2007/0294076 A1 | 12/2007 | Shore et al. | |
| 2008/0052061 A1 | 2/2008 | Kim et al. | |
| 2008/0065478 A1 | 3/2008 | Kohlmeier et al. | |
| 2008/0114583 A1 | 5/2008 | Al-Onaizan et al. | |
| 2008/0154581 A1 | 6/2008 | Lavi et al. | |
| 2008/0183555 A1 | 7/2008 | Walk | |
| 2008/0215418 A1 | 9/2008 | Kolve et al. | |
| 2008/0249760 A1 | 10/2008 | Marcu et al. | |
| 2008/0270109 A1 | 10/2008 | Och | |
| 2008/0270112 A1 | 10/2008 | Shimohata | |

(56) References Cited

U.S. PATENT DOCUMENTS

| | | | |
|---|---|---|---|
| 2008/0281578 | A1 | 11/2008 | Kumaran et al. |
| 2008/0307481 | A1 | 12/2008 | Panje |
| 2009/0076792 | A1 | 3/2009 | Lawson-Tancred |
| 2009/0083023 | A1 | 3/2009 | Foster et al. |
| 2009/0119091 | A1 | 5/2009 | Sarig |
| 2009/0125497 | A1 | 5/2009 | Jiang et al. |
| 2009/0234634 | A1 | 9/2009 | Chen et al. |
| 2009/0241115 | A1 | 9/2009 | Raffo et al. |
| 2009/0326912 | A1 | 12/2009 | Ueffing |
| 2010/0017293 | A1 | 1/2010 | Lung et al. |
| 2010/0042398 | A1 | 2/2010 | Marcu et al. |
| 2010/0138213 | A1 | 6/2010 | Bicici et al. |
| 2010/0174524 | A1 | 7/2010 | Koehn |
| 2011/0029300 | A1 | 2/2011 | Marcu et al. |
| 2011/0066643 | A1 | 3/2011 | Cooper et al. |
| 2011/0082684 | A1 | 4/2011 | Soricut et al. |

FOREIGN PATENT DOCUMENTS

| | | |
|---|---|---|
| EP | 0933712 | 8/1999 |
| EP | 933712 | 1/2001 |
| JP | 07244666 | 9/1995 |
| JP | 10011447 | 1/1998 |
| JP | 11272672 | 10/1999 |
| WO | WO 03083709 | 9/2003 |

OTHER PUBLICATIONS

Cohen, Hardware-Assisted Algorithm for full-text large-dictionary string matching using n-gram hashing, 1998, Information Processing and Management vol. 34, No. 4, pp. 443-464.*

Gupta et al, Kelips: Building an Efficient and Stable P2P DHT thorugh Increased Memory and Background Overhead, 2003, IPTPS 2003, LNCS 2735, pp. 160-169.*

Liu et al, Context Discovery Using Attenuated Bloom Filters in Ad-Hoc Networks, Springer, pp. 13-25.*

Elhadad, M. and Robin, J., "Controlling Content Realization with Functional Unification Grammars", 1992, Aspects of Automated Natural Language Generation, Dale et al. (eds)., Springer Verlag, pp. 89-104.

Elhadad, Michael, "FUF: the Universal Unifier User Manual Version 5.2", 1993, Department of Computer Science, Ben Gurion University, Beer Sheva, Israel.

Elhadad, Michael, "Using Argumentation to Control Lexical Choice: A Functional Unification Implementation", 1992, Ph.D. Thesis, Graduate School of Arts and Sciences, Columbia University.

Elhadad. M., and Robin, J., "Surge: a Comprehensive Plug-in Syntactic Realization Component for Text Generation", 1999 (available at http://www.cs.bgu.ac.il/-elhadad/pub.html).

Fleming, Michael et al., "Mixed-Initiative Translation of Web Pages," AMTA 2000, LNAI 1934, Springer-Verlag, Berlin, Germany, 2000, pp. 25-29.

Franz Josef Och, Hermann Ney: "Improved Statistical Alignment Models" ACLOO:Proc. of the 38th Annual Meeting of the Association for Computational Lingustics, 'Online! Oct. 2-6, 2000, pp. 440-447, XP002279144 Hong Kong, China Retrieved from the Internet: <URL:http://www-i6.informatik.rwth-aachen.de/Colleagues/och/ACLOO.ps>'retrieved on May 6, 2004! abstract.

Fuji, Ren and Hongchi Shi, "Parallel Machine Translation: Principles and Practice," Engineering of Complex Computer Systems, 2001 Proceedings, Seventh IEEE Int'l Conference, pp. 249-259, 2001.

Fung et al, "Mining Very-non parallel corpora: Parallel sentence and lexicon extractioin via bootstrapping and EM", In EMNLP 2004.

Fung, P. and Yee, L., "An IR Approach for Translating New Words from Nonparallel, Comparable Texts", 1998, 36th Annual Meeting of the ACL, 17th International Conference on Computational Linguistics, pp. 414-420.

Fung, Pascale, "Compiling Bilingual Lexicon Entries From a Non-Parallel English-Chinese Corpus", 1995, Proc. of the Third Workshop on Very Large Corpora, Boston, MA, pp. 173-183.

Gale, W. and Church, K., "A Program for Aligning Sentences in Bilingual Corpora," 1991, 29th Annual Meeting of the ACL, pp. 177-183.

Gale, W. and Church, K., "A Program for Aligning Sentences in Bilingual Corpora," 1993, Computational Linguisitcs, vol. 19, No. 1, pp. 177-184.

Galley et al., "Scalable Inference and Training of Context-Rich Syntactic Translation Models," Jul. 2006, in Proc. of the 21st International Conference on Computational Linguistics, pp. 961-968.

Galley et al., "What's in a translation rule?", 2004, in Proc. of HLT/NAACL '04, pp. 1-8.

Gaussier et al, "A Geometric View on Bilingual Lexicon Extraction from Comparable Corpora", In Proceedings of ACL 2004, July.

Germann et al., "Fast Decoding and Optimal Decoding for Machine Translation", 2001, Proc. of the 39th Annual Meeting of the ACL, Toulouse, France, pp. 228-235.

Germann, Ulrich: "Building a Statistical Machine Translation System from Scratch: How Much Bang for the Buck Can We Expect?" Proc. of the Data-Driven MT Workshop of ACL-01, Toulouse, France, 2001.

Gildea, D., "Loosely Tree-based Alignment for Machine Translation," In Proceedings of the 41st Annual Meeting on Assoc. for Computational Linguistics—vol. 1 (Sapporo, Japan, Jul. 7-12, 2003). Annual Meeting of the ACL Assoc. for Computational Linguistics, Morristown, NJ, 80-87. DOI=http://dx.doi.org/10.3115/1075096.1075107.

Grefenstette, Gregory, "The World Wide Web as a Resource for Example-Based Machine Translation Tasks", 1999, Translating and the Computer 21, Proc. of the 21 st International Cant. on Translating and the Computer. London, UK, 12 pp.

Grossi et al, "Suffix Trees and their applications in string algorithms", In. Proceedings of the 1st South American Workshop on String Processing, Sep. 1993, pp. 57-76.

Habash, Nizar, "The Use of a Structural N-gram Language Model in Generation-Heavy Hybrid Machine Translation," University of Maryland, Univ. Institute for Advance Computer Studies, Sep. 8, 2004.

Hatzivassiloglou, V. et al., "Unification-Based Glossing",. 1995, Proc. of the International Joint Conference on Artificial Intelligence, pp. 1382-1389.

Huang et al., "Relabeling Syntax Trees to Improve Syntax-Based Machine Translation Quality," Jun. 4-9 2006, in Proc. of the Human Language Techology Conference of the North Americna Chapter of the ACL, pp. 240-247.

Ide, N. and Veronis, J., "Introduction to the Special Issue on Word Sense Disambiguation: The State of the Art", Mar. 1998, Computational Linguistics, vol. 24, Issue 1, pp. 2-40.

Ikel, D., Schwartz, R., and Weischedei, R., "An Algorithm that learns What's in a Name," Machine Learning 34, 211-231 (1999).

Imamura et al., "Feedback Cleaning of Machine Translation Rules Using Automatic Evaluation," 2003 Computational Linguistics, pp. 447-454.

Imamura, Kenji, "Hierarchical Phrase Alignment Harmonized with Parsing", 2001, in Proc. of NLPRS, Tokyo.

Jason Eiser, Computer Science Department, Johns Hopkins University. "Learning Non-Isomorphic Tree Mappings for Machine Translation." 2003, pp. 205-208.

Jelinek, F., "Fast Sequential Decoding Algorithm Using a Stack", Nov. 1969, IBM J. Res. Develop., vol. 13, No. 6, pp. 675-685.

Jones, K. Sparck, "Experiments in Relevance Weighting of Search Terms", 1979, Information Processing & Management, vol. 15, Pergamon Press Ltd., UK, pp. 133-144.

K. Chen and H. Chen: "Machine Translation: An Integrated Approach" Proceedings of the Sixth International Conference on Theoretical and Methodological Issues in Machine Translation, 'Online! Jul. 5-7, 1995, pp. 287-294, XP002279141 Leuven, Belgium.

Kenji Yamada and Kevin Knight. "A Decoder for Syntax-Based Statistical MT." 40th Annual Meeting for ACL. Jul. 2002, 8 pages.

Kenji Yamada and Kevin Knight. "A Syntax Based Statistical translation Model", 39th Annual Meeting for the Association for Computational Linguistics, 2001, pp. 1-8.

Klein et al., "Accurate Unlexicalized Parsing," Jul. 2003m, in Proc. of the 41st Annual Meeting of the ACL, pp. 423-430.

(56) References Cited

OTHER PUBLICATIONS

Knight et al., "Integrating Knowledge Bases and Statistics in MT," 1994, Proc. of the Conference of the Association for Machine Translation in the Americas.
Knight et al., "Filling Knowledge Gaps in a Broad-Coverage Machine Translation System", 1995, Proc. of the 14th International Joint Conference on Artificial Intelligence, Montreal, Canada, vol. 2, pp. 1390-1396.
Knight, K. and Al-Onaizan, Y., "Machine Transliteration", 1997, Proc. of the ACL-97, Madrid, Spain, pp. 97.103.
Knight, K. and Al-Onaizan, Y., "A Primer on Finite-State Software for Natural Language Processing", 1999 (available at http://www.isLedullicensed-sw/carmel).
Knight, K. and Al-Onaizan, Y., "Translation with Finite -State Devices," Proceedings of the 4th AMTA Conference, 1998.
Knight, K. and Chander, I., "Automated Postediting of Documents,"1994, Proc. of the 12th Conference on Artificial Intelligence, pp. 779-784.
Knight, K. and Graehl, J., "Machine Transliteration", 1997, Proc. of the ACL-97, Madrid, Spain, pp. 128-135.
Knight, K. and Hatzivassiloglou, V., "Two-Level, Many-Paths Generation," D 1995, Proc. of the 33rd Annual Conference of the ACL, pp. 252-260.
Knight, K. and Luk, S., "Building a Large-Scale Knowledge Base for Machine Translation," 1994, Proc. of the 12th Conference on Artificial Intelligence, pp. 773-778.
Knight, K. and Marcu, D., "Statistics-Based Summarization—Step One: Sentence Compression," 2000, American Association for Artificial Intelligence Conference, pp. 703-710.
Knight, K. and Yamada, K., "A Computational Approach to Deciphering Unknown Scripts," 1999, Proc. of the ACL Workshop on Unsupervised Learning in Natural Language Processing.
Knight, K. et al., "Translation with Finite-State Devices," 1998, Proc. of the 3rd AMTA Conference, pp. 421-437.
Knight, K. et al., "Machine Transliteration of Names in Arabic Text," 2002, Proc. of the ACL Workshop on Computational Approaches to Semitic Languages.
Knight, Kevin, "A Statistical MT Tutorial Workbook," 1999, JHU Summer Workshop (available at http://www.isLedu/natural-language/mUwkbk.rtf).
Knight, Kevin, "Automating Knowledge Acquisition for Machine Translation," 1997, AI Magazine 18(4).
Knight, Kevin, "Connectionist Ideas and Algorithms," Nov. 1990, Communications of the ACM, vol. 33, No. 11, pp. 59-74.
Knight, Kevin, "Decoding Complexity in Word-Replacement Translation Models", 1999, Computational Linguistics, 25(4).
Knight, Kevin, "Integrating Knowledge Acquisition and Language Acquisition", May 1992, Journal of Applied Intelligence, vol. 1, No. 4.
Knight, Kevin, "Learning Word Meanings by Instruction,"1996, Proc. of the D National Conference on Artificial Intelligence, vol. 1, pp. 447-454.
Knight, Kevin, "Unification: A Multidisciplinary Survey," 1989, ACM Computing Surveys, vol. 21, No. 1.
Koehn, Philipp, "Noun Phrase Translation," A PhD Dissertation for the University of Southern California, pp. xiii, 23, 25-57, 72-81, Dec. 2003.
Koehn, P. and Knight, K., "ChunkMT: Statistical Machine Translation with Richer Linguistic Knowledge," Apr. 2002, Information Sciences Institution.
Koehn, P. and Knight, K., "Estimating Word Translation Probabilities from Unrelated Monolingual Corpora Using the EM Algorithm," 2000, Proc. of the 17th meeting of the AAAI.
Koehn, P. and Knight, K., "Knowledge Sources for Word-Level Translation Models," 2001, Conference on Empirical Methods in Natural Language Processing.
Kumar, R. and L1, H., "Integer Programming Approach to Printed Circuit Board Assembly Time Optimization," 1995, IEEE Transactions on Components, Packaging, and Manufacturing, Part B: Advance Packaging, vol. 18, No. 4. pp. 720-727.

Kupiec, Julian, "An Algorithm for Finding Noun Phrase Correspondecnes in Bilingual Corpora," In Proceedings of the 31st Annual Meeting of the ACL, 1993, pp. 17-22.
Kurohashi, S. and Nagao, M., "Automatic Detection of Discourse Structure by Checking Surface Information in Sentences," 1994, Proc. of COL-LING '94, vol. 2, pp. 1123-1127.
Langkilde, I. and Knight, K., "Generation that Exploits Corpus-Based Statistical Knowledge," 1998, Proc. of the COLING-ACL, pp. 704-710.
Langkilde, I. and Knight, K., "The Practical Value of N-Grams in Generation," 1998, Proc. of the 9th International Natural Language Generation Workshop, pp. 248-255.
Langkilde, Irene, "Forest-Based Statistical Sentence Generation," 2000, Proc. of the 1st Conference on North American chapter of the ACL, Seattle, WA, pp. 170-177.
Langkilde-Geary, Irene, "A Foundation for General-Purpose Natural Language Generation: Sentence Realization Using Probabilistic Models of Language," 2002, Ph.D. Thesis, Faculty of the Graduate School, University of Southern California.
Langkilde-Geary, Irene, "An Empirical Verification of Coverage and Correctness for a General-Purpose Sentence Generator," 1998, Proc. 2nd Int'l Natural Language Generation Conference.
Lee-Y.S.' "Neural Network Approach to Adaptive Learning: with an Application to Chinese Homophone Disambiguation," IEEE pp. 1521-1526.
Llitjos, A. F. et al., "The Translation Correction Tool: English-Spanish User Studies," Citeseer © 2004, downloaded from: http://gs37.sp.cs.cmu.edu/ari/papers/Irec04/fontll, pp. 1-4.
Mann, G. and Yarowsky, D., "Multipath Translation Lexicon Induction via Bridge Languages," 2001, Proc. of the 2nd Conference of the North American Chapter of the ACL, Pittsburgh, PA, pp. 151-158.
Mann, "Multipath Translation Lexicon Induction via Bridge Language," 2001, Johns Hopkins University, pp. 1-8.
Manning, C. and Schutze, H., "Foundations of Statistical Natural Language Processing," 2000, The MIT Press, Cambridge, MA [redacted].
Marcu, D. and Wong, W., "A Phrase-Based, Joint Probability Model for Statistical Machine Translation," 2002, Proc. of ACL-2 conference on Empirical Methods in Natural Language Processing, vol. 10, pp. 133-139.
Marcu, Daniel, "Building Up Rhetorical Structure Trees," 1996, Proc. of the National Conference on Artificial Intelligence and Innovative Applications of Artificial Intelligence Conference, vol. 2, pp. 1069-1074.
Marcu, Daniel, "Discourse trees are good indicators of importance in text," 1999, Advances in Automatic Text Summarization, The MIT Press, Cambridge, MA.
Marcu, Daniel, "Instructions for Manually Annotating the Discourse Structures of Texts," 1999, Discourse Annotation, pp. 1-49.
Marcu, Daniel, "The Rhetorical Parsing of Natural Language Texts," 1997, Proceedings of ACLIEACL '97, pp. 96-103.
Marcu, Daniel, "The Rhetorical Parsing, Summarization, and Generation of Natural Language Texts," 1997, Ph.D. Thesis, Graduate Department of Computer Science, University of Toronto.
Marcu, Daniel, "Towards a Unified Approach to Memory—and Statistical-Based Machine Translation," 2001, Proc. of the 39th Annual Meeting of the ACL, pp. 378-385.
McCallum, A. and Li, W., "Early Results for Named Entity Recognition with Conditional Random Fields, Feature Induction and Web-enhanced Lexicons," In Proceedings of the Seventh Conference on Natural Language Learning at HLT-NAACL, 2003, vol. 4 (Edmonton, Canada), Assoc. for Computational Linguistics, Morristown, NJ, pp. 188-191.
McDevitt, K. et al., "Designing of a Community-based Translation Center," Technical Report TR-03-30, Computer Science, Virginia Tech, © 2003, pp. 1-8.
Melamed, I. Dan, "A Word-to-Word Model of Translational Equivalence," 1997, Proc. of the 35th Annual Meeting of the ACL, Madrid, Spain, pp. 490-497.
Melamed, I. Dan, "Automatic Evaluation and Uniform Filter Cascades for Inducing N-Best Translation Lexicons," 1995, Proc. of the 3rd Workshop on Very Large Corpora, Boston, MA, pp. 184-198.

(56) References Cited

OTHER PUBLICATIONS

Melamed, I. Dan, "Empirical Methods for Exploiting Parallel Texts," 2001, MIT Press, Cambridge, MA [table of contents].

Meng et al.. "Generating Phonetic Cognates to Handle Named Entities in English-Chinese Cross-Language Spoken Document Retrieval," 2001, IEEE Workshop on Automatic Speech Recognition and Understanding. pp. 311-314.

Metze, F. et al., "The Nespole! Speech-to-Speech Translation System," Proc. of the HLT 2002, 2nd Int'l Conf. on Human Language Technology (San Francisco, CA), © 2002, pp. 378-383.

Mikheev et al., "Named Entity Recognition without Gazeteers," 1999, Proc. of European Chapter of the ACL, Bergen, Norway, pp. 1-8.

Miike et al., "A full-text retrieval system with a dynamic abstract generation function," 1994, Proceedings of SI-GIR '94, pp. 152-161.

Mohri, M. and Riley, M., "An Efficient Algorithm for the N-Best-Strings Problem," 2002, Proc. of the 7th Int. Conf. on Spoken Language Processing (ICSLP'02), Denver, CO, pp. 1313-1316.

Mohri, Mehryar, "Regular Approximation of Context Free Grammars Through Transformation", 2000, pp. 251-261, "Robustness in Language and Speech Technology", Chapter 9, Kluwer Academic Publishers.

Monasson et al., "Determining computational complexity from characteristic 'phase transitions'," Jul. 1999, Nature Magazine, vol. 400, pp. 133-137.

Mooney, Raymond, "Comparative Experiments on Disambiguating Word Senses: An Illustration of the Role of Bias in Machine Learning," 1996, Proc. of the Conference on Empirical Methods in Natural Language Processing, pp. 82-91.

Nagao, K. et al., "Semantic Annotation and Transcoding: Making Web Content More Accessible," IEEE Multimedia, vol. 8, Issue 2 Apr.-Jun. 2001, pp. 69-81.

Nederhof, M. and Satta, G., "IDL-Expressions: A Formalism for Representing and Parsing Finite Languages in Natural Language Processing," 2004, Journal of Artificial Intelligence Research, vol. 21, pp. 281-287.

Niessen,S. and Ney, H, "Toward hierarchical models for statistical machine translation of inflected languages," 2001, Data-Driven Machine Translation Workshop, Toulouse, France, pp. 47-54.

Norvig, Peter, "Techniques for Automatic Memoization with Applications to Context-Free Parsing", Compuational Linguistics,1991, pp. 91-98, vol. 17, No. 1.

Och et al., "Improved Alignment Models for Statistical Machine Translation," 1999, Proc. of the Joint Conf. of Empirical Methods in Natural Language Processing and Very Large Corpora, pp. 20-28.

Och et al. "A Smorgasbord of Features for Statistical Machine Translation." HLTNAACL Conference. Mar. 2004, 8 pages.

Och, F., "Minimum Error Rate Training in Statistical Machine Translation," In Proceedings of the 41st Annual Meeting on Assoc. for Computational Linguistics—vol. 1 (Sapporo, Japan, Jul. 7-12, 2003). Annual Meeting of the ACL. Assoc. for Computational Linguistics, Morristown, NJ, 160-167. DOI= http://dx.doi.org/10.3115/1075096.

Och, F. and Ney, H, "Improved Statistical Alignment Models," 2000, 38th Annual Meeting of the ACL, Hong Kong, pp. 440-447.

Wang, Y. and Waibel, A., "Decoding Algorithm in Statistical Machine Translation," 1996, Proc. of the 35th Annual Meeting of the ACL, pp. 366-372.

Wang, Ye-Yi, "Grammar Inference and Statistical Machine Translation," 1998, Ph.D Thesis, Carnegie Mellon University, Pittsburgh, PA.

Watanabe et al., "Statistical Machine Translation Based on Hierarchical Phrase Alignment," 2002, 9th International Conference on Theoretical and Methodological Issues in Machin Translation (TMI-2002), Keihanna, Japan, pp. 188-198.

Witbrock, M. and Mittal, V., "Ultra-Summarization: A Statistical Approach to Generating Highly Condensed Non-Extractive Summaries," 1999, Proc. of SIGIR '99, 22nd International Conference on Research and Development in Information Retrieval, Berkeley, CA, pp. 315-316.

Wu, Dekai, "A Polynomial-Time Algorithm for Statistical Machine Translation," 1996, Proc. of 34th Annual Meeting of the ACL, pp. 152-158.

Wu, Dekai, "Stochastic Inversion Transduction Grammars and Bilingual Parsing of Parallel Corpora," 1997, Computational Linguistics, vol. 23, Issue 3, pp. 377-403.

Yamada, K. and Knight, K. "A Syntax-based Statistical Translation Model," D 2001, Proc. of the 39th Annual Meeting of the ACL, pp. 523-530.

Yamada, K. and Knight, K., "A Decoder for Syntax-based Statistical MT," 2001, Proceedings of the 40th Annual Meeting of the ACL, pp. 303-310.

Yamada K., "A Syntax-Based Statistical Translation Model," 2002 PhD Dissertation, pp. 1-141.

Yamamoto et al., "A Comparative Study on Translation Units for Bilingual Lexicon Extraction," 2001, Japan Academic Association for Copyright Clearance, Tokyo, Japan.

Yamamoto et al, "Acquisition of Phrase-level Bilingual Correspondence using Dependency Structure" In Proceedings of COLING-2000, pp. 933-939.

Yarowsky, David, "Unsupervised Word Sense Disambiguation Rivaling Supervised Methods," 1995, 33rd Annual Meeting of the ACL, pp. 189-196.

Ying, Stephan V. et al., "The CMU Statistical Machine Translation System," In Proceedings of MT Summit IX 2003.

Zhang et al., "Synchronous Binarization for Machine Translations," Jun. 4-9, 2006, in Proc. of the Human Language Technology Conference of the North American Chapter of the ACL, pp. 256-263.

Zhang et al., "Distributed Language Modeling for N-best List Reranking," in Proceedings of the 2006 Conference on Empirical Methods in Natural Language Processing (Sydney, Australia, Jul. 22-23, 2006). ACL Workshops. Assoc. for Computational Linguistics, Morristown, NJ, 216-223.

Patent Cooperation Treaty International Preliminary Report on Patentability and the Written Opinion, International application No. PCT/US2008/004296, Oct. 6, 2009, 5 pgs.

Abney, Stephen, "Parsing by Chunks," 1991, Principle-Based Parsing: Computation and Psycholinguistics, vol. 44, pp. 257-279.

Agbago, A., et al., "True-casing for the Portage System," In Recent Advances in Natural Language Processing (Borovets, Bulgaria), Sep. 21-23, 2005, pp. 21-24.

Al-Onaizan et al., "Statistical Machine Translation," 1999, JHU Summer Tech Workshop, Final Report, pp. 1-42.

Al-Onaizan et al., "Translating with Scarce Resources," 2000, 17th National Conference of the American Association for Artificial Intelligence, Austin, TX, pp. 672-678.

Al-Onaizan et al., "Translation with Scarce Resources," 2000 Univ. of Southern Calif., pp. 1-7.

Al-Onaizan, Y. and Knight K., "Machine Transliteration of Names in Arabic Text,"Proceedings of ACL Workshop on Computational Approaches to Semitic Languages. Philadelphia, 2002.

Al-Onaizan, Y. and Knight, K., "Named Entity Translation: Extended Abstract", 2002, Proceedings of HLT-02, San Diego, CA.

Al-Onaizan, Y. and Knight, K., "Translating Named Entities Using Monolingual and Bilingual Resources," 2002, Proc. of the 40th Annual Meeting of the ACL, pp. 400-408.

Al-Onaizan, Y.,Curin, J., Jahr, M., Knight, K., Lafferty, J., Melamed, D., Och, F.-J., Purdy, D., Smith, N. A., and Yarowsky, D., "Statistical Machine Translation , Final Report," JHU Workshop 1999. Technical Report, CLSP/JHU, 1999.

Alshawi et al., "Learning Dependency Translation Models as Collections of Finite-State Head Transducers," 2000, Computational Linguistics, vol. 26, pp. 45-60.

Alshawi, Hiyan, "Head Automata for Speech Translation", Proceedings of the ICSLP 96, 1996, Philadelphia, Pennslyvania.

Ambati, "Dependency Structure Trees in Syntax Based Machine Translation," Spring 2008 Report <http://www.cs.cmu.edu/~vamshi/publications/DependencyMT_report.pdf>, pp. 1-8.

Arabi et al., "Algorithms for Arabic name transliteration," Mar. 1994, IBM Journal of Research and Development, vol. 38, Issue 2, pp. 183-194.

(56) References Cited

OTHER PUBLICATIONS

Arun, A., et al., "Edinburgh System Description for the 2006 TC-STAR Spoken Language Translation Evaluation," in TC-STAR Workshop on Speech-to-Speech Translation (Barcelona, Spain), Jun. 2006, pp. 37-41.
Ballesteros, L. et al., "Phrasal Translation and Query Expansion Techniques for Cross-Language Information," SIGIR 97, Philadelphia, PA, © 1997, pp. 84-91.
Bangalore, S. and Rambow, O., "Evaluation Metrics for Generation," 2000, Proc. of the 1st International Natural Language Generation Conf., vol. 14, pp. 1-8.
Bangalore, S. and Rambow, O., "Using TAGs, a Tree Model, and a Language Model for Generation," May 2000, Workshop TAG+5, Paris.
Bangalore, S. and Rambow, O., "Corpus-Based Lexical Choice in Natural Language Generation," 2000, Proc. of the 38th Annual ACL, Hong Kong, pp. 464-471.
Bangalore, S. and Rambow, O., "Exploiting a Probabilistic Hierarchical Model for Generation," 2000, Proc. of 18th conf. on Computational Linguistics, vol. 1, pp. 42-48.
Bannard, C. and Callison-Burch, C., "Paraphrasing with Bilingual Parallel Corpora," In Proceedings of the 43rd Annual Meeting on Association for Computational Linguistics (Ann Arbor, MI, Jun. 25-30, 2005). Annual Meeting of the ACL Assoc. for Computational Linguistics, Morristown, NJ, 597-604. DOI=http://dx.doi.org/10.3115/1219840.
Barnett et al., "Knowledge and Natural Language Processing," Aug. 1990, Communications of the ACM, vol. 33, Issue 8, pp. 50-71.
Baum, Leonard, "An Inequality and Associated Maximization Technique in Statistical Estimation for Probabilistic Functions of Markov Processes", 1972, Inequalities 3:1-8.
Berhe, G. et al., "Modeling Service-baed Multimedia Content Adaptation in Pervasive Computing," CF '04 (Ischia, Italy) Apr. 14-16, 2004, pp. 60-69.
Bikel et al., "An Algorithm that Learns What's in a Name," 1999, Machine Learning Journal Special Issue on Natural Language Learning, vol. 34, pp. 211-232.
Boitet, C. et al., "Main Research Issues in Building Web Services," Proc. of the 6th Symposium on Natural Language Processing, Human and Computer Processing of Language and Speech, © 2005, pp. 1-11.
Brants, Thorsten, "TnT—a Statistical Part-of-Speech Tagger," 2000, Proc. of the 6th Applied Natural Language Processing Conference, Seattle.
Brill, Eric, "Transformation-Based Error-Driven Learning and Natural Language Processing: A Case Study in Part of Speech Tagging", 1995, Assocation for Computational Linguistics, vol. 21, No. 4, pp. 1-37.
Brill, Eric. "Transformation-Based Error-Driven Learning and Natural Language Processing: A Case Study in Part of Speech Tagging",1995, Computational Linguistics, vol. 21, No. 4, pp. 543-565.
Brown et al., "A Statistical Approach to Machine Translation," Jun. 1990, Computational Linguistics, vol. 16, No. 2, pp. 79-85.
Brown et al., "Word-Sense Disambiguation Using Statistical Methods," 1991, Proc. of 29th Annual ACL, pp. 264-270.
Brown et al., "The Mathematics of Statistical Machine Translation: Parameter D Estimation," 1993, Computational Linguistics, vol. 19, Issue 2, pp. 263-311.
Brown, Ralf, "Automated Dictionary Extraction for "Knowledge-Free" Example-Based Translation," 1997, Proc. of 7th Int'l Cont. on Theoretical and Methodological Issues in MT, Santa Fe, NM, pp. 111-118.
Callan et al., "TREC and TIPSTER 'Experiments with INQUERY," 1994, Information Processing and Management, vol. 31, Issue 3, pp. 327-343.
Callison-Burch, C. et al., "Statistical Machine Translation with Word—and Sentence-aligned Parallel Corpora," In Proceedings of the 42nd Meeting on Assoc. for Computational Linguistics (Barcelona, Spain, Jul. 21-26, 2004). Annual Meeting of the ACL. Assoc. for Computational Linguistics, Morristown, NJ, 1.
Carl, Michael. "A Constructivist Approach to Machine Translation," 1998, New Methods of Language Processing and Computational Natural Language Learning, pp. 247-256.
Chen, K. and Chen, H., "Machine Translation: An Integrated Approach," 1995, Proc. of 6th Int'l Cont. on Theoretical and Methodological Issue in MT, pp. 287-294.
Cheng, P. et al., "Creating Multilingual Translation Lexicons with Regional Variations Using Web Corpora," In Proceedings of the 42nd Annual Meeting on Assoc. for Computational Linguistics (Barcelona, Spain, Jul. 21-26, 2004). Annual Meeting of the ACL. Assoc. for Computational Linguistics, Morristown, NJ, 53.
Cheung et al., "Sentence Alignment in Parallel, Comparable, and Quasi-comparable Corpora", In Proceedings of LREC, 2004, pp. 30-33.
Chinchor, Nancy, "MUC-7 Named Entity Task Definition," 1997, Version 3.5.
Clarkson, P. and Rosenfeld, R., "Statistical Language Modeling Using the CMU-Cambridge Toolkit", 1997, Proc. ESCA Eurospeech, Rhodes, Greece, pp. 2707-2710.
Corston-Oliver, Simon, "Beyond String Matching and Cue Phrases: Improving Efficiency and Coverage in Discourse Analysis", 1998, The AAAI Spring Symposium on Intelligent Text Summarization, pp. 9-15.
Covington, "An Algorithm to Align Words for Historical Comparison", Computational Linguistics, 1996, 22(4), p. 481-496.
Dagan, I. and Itai, A., "Word Sense Disambiguation Using a Second Language Monolingual Corpus", 1994, Association for Computational Linguistics, vol. 20, No. 4, pp. 563-596.
Dempster et al., "Maximum Likelihood from Incomplete Data via the EM Algorithm", 1977, Journal of the Royal Statistical Society, vol. 39, No. 1, pp. 1-38.
Diab, M. and Finch, S., "A Statistical Word-Level Translation Model for Comparable Corpora," 2000, In Proc.of the Conference on Content Based Multimedia Information Access (RIAO).
Diab, Mona, "An Unsupervised Method for Multilingual Word Sense Tagging Using Parallel Corpora: A Preliminary Investigation", 2000, SIGLEX Workshop on Word Senses and Multi-Linguality, pp. 1-9.
Eisner, Jason,"Learning Non-Isomorphic Tree Mappings for Machine Translation," 2003, in Proc. of the 41st Meeting of the ACL, pp. 205-208.
Elhadad et al., "Floating Constraints in Lexical Choice", 1996, ACL, 23(2): 195-239.
Elhadad, M. and Robin, J., "An Overview of Surge: a Reusable Comprehensive Syntactic Realization Component," 1996, Technical Report 96-03, Department of Mathematics and Computer Science, Ben Gurion University, Beer Sheva, Israel.
Och, F. and Ney, H., "Discriminative Training and Maximum Entropy Models for Statistical Machine Translation," 2002, Proc. of the 40th Annual Meeting of the ACL, Philadelphia, PA, pp. 295-302.
Och, F. and Ney, H., "A Systematic Comparison of Various Statistical Alignment Models," Computational Linguistics, 2003, 29:1, 19-51.
Papineni et al., "Bleu: a Method for Automatic Evaluation of Machine Translation," 2001, IBM Research Report, RC22176.
P. Koehn and K. Knight: "ChunkMT: Statistical Machine Translation with Richer Linguistic Knowledge" Information Sciences Institute, 'Online! Apr. 20, 2002, XP00279142 Marina del Rey, CA USA Retrieved from the Internet: <URL:http://www.isi.edu/{koehn/publications/chunkmtpdf> retrieved on MAy 6, 2004!
Perugini, Saviero et al., "Enhancing Usability in CITIDEL: Multimodal, Multilingual and Interactive Visualization Interfaces," JCDL '04, Tucson, AZ, Jun. 7-11, 2004, pp. 315-324.
Petrov et al., "Learning Accurate, Compact and Interpretable Tree Annotation," Jun. 4-9, 2006, in Proc. of the Human Language Technology Conference of the North American Chapter of the ACL, pp. 433-440.
Pla et al., "Tagging and Chunking with Bigrams," 2000, Proc. of the 18th Conference on Computational Linguistics, vol. 2, pp. 614-620.
Qun, Liu, "A Chinese-English Machine Translation System Based on Micro-Engine Architecture," An Int'l Conference on Translation and Information Technology, Hong Kong, Dec. 2000, pp. 1-10.
Rambow, O. and Bangalore S., "Corpus-Based Lexical Choice in Natural Language Generation," Proceedings of the 38th Annual Meeting on Association for Computational Linguistics, 2000.

(56) References Cited

OTHER PUBLICATIONS

Rapp, Reinhard, Automatic Identification of Word Translations from Unrelated English and German Corpora, 1999, 37th Annual Meeting of the ACL, pp. 519-526.
Rapp, Reinhard, "Identifying Word Translations in Non-Parallel Texts," 1995, 33rd Annual Meeting of the ACL, pp. 320-322.
Resnik, P. and Smith, A., "The Web as a Parallel Corpus," Sep. 2003, Computational Linguistics, Special Issue on Web as Corpus, vol. 29, Issue 3, pp. 349-380.
Resnik, P. and Yarowsky, D. "A Perspective on Word Sense Disambiguation Methods and Their Evaluation," 1997, Proceedings of SIGLEX '97, Washington, D.C., pp. 79-86.
Resnik, Philip, "Mining the Web for Bilingual Text," 1999, 37th Annual Meeting of the ACL, College Park, MD, pp. 527-534.
Rich, E. and Knight, K., "Artificial Intelligence, Second Edition," 1991, McGraw-Hili Book Company [redacted].
Richard et al., "Visiting the Traveling Salesman Problem with Petri nets and application in the glass industry," Feb. 1996, IEEE Emerging Technologies and Factory Automation, pp. 238-242.
Robin, Jacques, "Revision-Based Generation of Natural Language Summaries Providing Historical Background: Corpus-Based Analysis, Design Implementation and Evaluation," 1994, Ph.D. Thesis, Columbia University, New York.
Rogati et al., "Resource Selection for Domain-Specific Cross-Lingual IR," ACM 2004, pp. 154-161.
Ruiqiang, Z. et al., "The NiCT-ATR Statistical Machine Translation System for the IWSLT 2006 Evaluation," submitted to IWSLT, 2006.
Russell, S. and Norvig, P., "Artificial Intelligence: A Modern Approach," 1995, Prentice-Hall, Inc., New Jersey [redacted—table of contents].
Sang, E. and Buchholz, S., "Introduction to the CoNLL-2000 Shared Task: Chunking," 20002, Proc. of CoNLL-2000 and LLL-2000, Lisbon, Portugal, pp. 127-132.
Schmid, H., and Schulte im Walde, S., "Robust German Noun Chunking With a Probabilistic Context-Free Grammar," 2000, Proc. of the 18th Conference on Computational Linguistics, vol. 2, pp. 726-732.
Schutze, Hinrich, "Automatic Word Sense Discrimination," 1998, Computational Linguistics, Special Issue on Word Sense Disambiguation, vol. 24, Issue 1, pp. 97-123.
Selman et al., "A New Method for Solving Hard Satisfiability Problems," 1992, Proc. of the 10th National Conference on Artificial Intelligence, San Jose, CA, pp. 440-446.
Shankar Kumar and William Byrne. "Minimum Bayes-Risk Decoding for Statistical Machine Translation." HLTNAACL Conference. Mar. 2004, 8 pages.
Shapiro, Stuart (ed.), "Encyclopedia of Artificial Intelligence, 2nd edition", vol. D 2, 1992, John Wiley & Sons Inc; "Unification" article, K. Knight, pp. 1630-1637.
Sobashima et al., "A Bidirectional Transfer-Driven Machine Translation System for Spoken Dialogues," 1994, Proc. of 15th Conference on Computational Linguistics, vol. 1, pp. 64-68.
Soricut et al., "Using a large monolingual corpus to improve translation accuracy," 2002, Lecture Notes in Computer Science, vol. 2499, Proc. of the 5th Conference of the Association for Machine Translation in the Americas on Machine Translation: From Research to Real Users, pp. 155-164.
Stalls, B. and Knight, K., "Translating Names and Technical Terms in Arabic Text," 1998, Proc. of the Coling/ ACL Workkshop on Computational Approaches to Semitic Language.
Sumita et al., "A Discourse Structure Analyzer for Japanese Text," 1992, Proc. of the International Conference on Fifth Generation Computer Systems, vol. 2, pp. 1133-1140.
Sun et al., "Chinese Named Entity Identification Using Class-based Language Model," 2002, Proc. of 19th International Conference on Computational Linguistics, Taipei, Taiwan, vol. 1, pp. 1-7.
Tanaka, K. and Iwasaki, H. "Extraction of Lexical Translations from Non-Aligned Corpora," Proceedings of COLING 1996.
Taro Watanabe, Kenji Imammura and Eiichiro Sumita: "Statistical Machine Translation Based on Hierarchical Phrase Alignment" Proceedings of the 9th International Conference on Theorretical and Methodological Issues in Machine Translation, 'Online! Mar. 13-17, 2002, XP002279140 Keihanna, Japan Retrieved from the Internet: <URL:http://www.eamt.org/archive/tmi2002/conference/19_atanabe.pdf> retrieved on May 6, 2004!
Taskar, B., et al., "A Discriminative Matching Approach to Word Alignment," In Proceedings of the Conference on Human Language Technology and Empirical Methods in Natural Language Processing (Vancouver, BC, Canada, Oct. 6-8, 2005). Human Language Technology Conference. Assoc. for Computational Linguistics, Morristown, NJ.
Taylor et al., "The Penn Treebank: An Overview," in A. Abeill (ed.), D Treebanks: Building and Using Parsed Corpora, 2003, pp. 5-22.
Tiedemann, Jorg, "Automatic Construction of Weighted String Similarity Measures," 1999, In Proceedings of the Joint SIGDAT Conference on Emperical Methods in Natural Language Processing and Very Large Corpora.
Tillman, C. and Xia, F., "A Phrase-Based Unigram Model for Statistical Machine Translation," 2003, Proc. of the North American Chapter of the ACL on Human Language Technology, vol. 2, pp. 106-108.
Tillmann et al., "A DP based Search Using Monotone Alignments in Statistical Translation," 1997, Proc. of the Annual Meeting of the ACL, pp. 366-372.
Tomas, J., "Binary Feature Classification for Word Disambiguation in Statistical Machine Translation," Proceedings of the 2nd Int'l Workshop on Pattern Recognition, 2002, pp. 1-12.
Uchimoto, K. et al., "Word Translation by Combining Example-based Methods and Machine Learning Models," Natural LanguageProcessing (Shizen Gengo Shori), vol. 10, No. 3, Apr. 2003, pp. 87-114.
Uchimoto, K. et al., "Word Translation by Combining Example-based Methods and Machine Learning Models," Natural LanguageProcessing (Shizen Gengo Shori), vol. 10, No. 3, Apr. 2003, pp. 87-114. (English Translation).
Ueffing et al., "Generation of Word Graphs in Statistical Machine Translation," 2002, Proc. of Empirical Methods in Natural Language Processing (EMNLP), pp. 156-163.
Varga et al, "Parallel corpora for medium density languages", In Proceedings of RANLP 2005, pp. 590-596.
Veale, T. and Way, A., "Gaijin: A Bootstrapping, Template-Driven Approach to Example-Based MT," 1997, Proc. of New Methods in Natural Language Processing (NEMPLP97), Sofia, Bulgaria.
Vogel et al., "The CMU Statistical Machine Translation System," 2003, Machine Translation Summit IX, New Orleans, LA.
Vogel et al., "The Statistical Translation Module in the Verbmobil System," 2000, Workshop on Multi-Lingual Speech Communication, pp. 69-74.
Vogel, S. and Ney, H., "Construction of a Hierarchical Translation Memory," 2000, Proc. of Cooling 2000, Saarbrucken, Germany, pp. 1131-1135.
Vogel S; Och F-J; Ney: "The statistical translation module in the Vermobil system" Workshop on Multi-Lingual Speech Communication, 'Online! Oct. 11-13, 2000, pp. 69-74, XP 002279143 Kyoto, Japan Retrieved from the Internet: <URL:http://www-i6.infromatik.rwth-aachen.de/Colleagues/och/Translation_ATR_17Aug00.ps> retrieved on May 6, 2004!
"Bangalore, S. and Rambow, O., ""Using TAGs, a Tree Model, and a Language Model for Generation,"" May 2000,Workshop TAG+5, Paris".
Gale, W. and Church, K., "A Program for Aligning Sentences in Bilingual Corpora," 1993, Computational Linguistics, vol. 19, No. 1, pp. 75-102.
Document, Wikipedia.com, web.archive.org (Feb. 24, 2004) <http://web.archive.org/web/20040222202831 /http://en. wikipedia.org/wikiiDocument>, Feb. 24, 2004.
Identifying, Dictionary.com, wayback.archive.org (Feb. 28, 2007) <http://wayback.archive.org/web/200501 01 OOOOOO*/http:////dictionary.reference.com//browse//identifying>, Feb. 28, 2005 <http://web.archive.org/web/20070228150533/http://dictionary.reference.com/browse/identifying>.
Koehn, P. et al, "Statistical Phrase-Based Translation," Proceedings of HLT-NAACL 2003 Main Papers, pp. 48-54 Edmonton, May-Jun. 2003.

(56) References Cited

OTHER PUBLICATIONS

Abney, S.P., "Stochastic Attribute Value Grammars", Association for Computional Linguistics, 1997, pp. 597-618.
Fox, H., "Phrasal Cohesion and Statistical Machine Translation" Proceedings of the Conference on Empirical Methods in Natural Language Processing, Philadelphia, Jul. 2002, pp. 304-311. Association for Computational Linguistics. <URL: http://acl.ldc.upenn.edu/W/W02/W02-1039.pdf>.
Tillman, C., et al, "Word Reordering and a Dynamic Programming Beam Search Algorithm for Statistical Machine Translation," 2003, Association for Computational Linguistics, vol. 29, No. 1, pp. 97-133 <URL: http://acl.ldc.upenn.edu/J/J03/J03-1005.pdf>.
Wang, W., et al. "Capitalizing Machine Translation" In HLT-NAACL '06 Proceedings Jun. 2006. <http://www.isi.edu/natural-language/mt/hlt-naac1-06-wang.pdf>.
Langlais, P. et al., "TransType: a Computer-Aided Translation Typing System" EmbedMT '00 ANLP-NAACL 2000 Workshop: Embedded Machine Translation Systems, 2000, pp. 46-51. <http://acl.ldc.upenn.edu/W/W00/W00-0507.pdf>.
Ueffing et al., "Using Pos Information for Statistical Machine Translation into Morphologically Rich Languages," In EACL, 2003: Proceedings of the Tenth Conference on European Chapter of the Association for Computational Linguistics, pp. 347-354.
Frederking et al., "Three Heads are Better Than One," In Proceedings of the 4th Conference on Applied Natural Language Processing, Stuttgart, Germany, 1994, pp. 95-100.
Och et al., "Discriminative Training and Maximum Entropy Models for Statistical Machine Translation," In Proc. of the 40th Annual Meeting of the Association for Computational Linguistics (ACL), Philadelphia, PA, 2002.
Yasuda et al., "Automatic Machine Translation Selection Scheme to Output the Best Result," Proc of LREC, 2002, pp. 525-528.
Rayner et al.,"Hybrid Language Processing in the Spoken Language Translator," IEEE, 1997, pp. 107-110.
Lita, L., et al., "tRuEcasing," Proceedings of the 41st Annual Meeting of the Assoc. for Computational Linguistics (In Hinrichs, E. and Roth, D.—editors), 2003, pp. 152-159.
Shirai, S., "A Hybrid Rule and Example-based Method for Machine Translation," NTT Communication Science Laboratories, 1997, pp. 1-5.
Cohen, Yossi, "Interpreter for FUF," (available at ftp://ftp.cs.bgu.ac.il/pUb/people/elhadad/fuf-life.lf), downloaded on Jun. 1, 2008.
Knight, Kevin, "Automating Knowledge Acquisition for Machine Translation," 1997, AI Magazine, vol. 18, No. 4.
Papineni et al., "Bleu: a Method for Automatic Evaluation of Machine Translation", Proc. of the 40th Annual Meeting of the Association for Computational Linguistics (ACL), Jul. 2002.
Shaalan et al., "Machine Translation of English Noun Phrases into Arabic", (2004), vol. 17, No. 2, International Journal of Computer Processing of Oriental Languages, 14 pages.
Isahara et al., "Analysis, Generation and Semantic Representation in Contrast—A Context-Based Machine Translation System", 1995, Systems and Computers in Japan, vol. 26, No. 14, pp. 37-53.
Proz.com, Rates for proofreading versus Translating, http://www.proz.com/forum/business_issues/202-rates_for_proofreading_versus_translating.html, Apr. 23, 2009, retrieved Jul. 13, 2012.
Celine, Volume discounts on large translation project, naked translations, http://www.nakedtranslations.com/en/2007/volume-discounts-on-large-translation-projects/, Aug. 1, 2007, retrieved Jul. 16, 2012.
Graehl, J and Knight, K, May 2004, Training tree transducers. In NAACL-HLT (2004), pp. 105-112.
Niessen et al, "Statistical machine translation with scarce resources using morphosyntactic information", Jun. 2004, Computational Linguistics, vol. 30, issue 2, pp. 181-204.
Liu et al., "Context Discovery Using Attenuated Bloom Filters in Ad-Hoc Networks," Springer, pp. 13-25, 2006.
First Office Action mailed Jun. 7, 2004 in Canadian Patent Application 2408819, filed May 11, 2001.
First Office Action mailed Jun. 14, 2007 in Canadian Patent Application 2475857, filed Mar. 11, 2003.
Office Action mailed Mar. 26, 2012 in German Patent Application 10392450.7, filed Mar. 28, 2003.
First Office Action mailed Nov. 5, 2008 in Canadian Patent Application 2408398, filed Mar. 27, 2003.
Second Office Action mailed Sep. 25, 2009 in Canadian Patent Application 2408398, filed Mar. 27, 2003.
First Office Action mailed Mar. 1, 2005 in European Patent Application No. 03716920.8, filed Mar. 27, 2003.
Second Office Action mailed Nov. 9, 2006 in European Patent Application No. 03716920.8, filed Mar. 27, 2003.
Third Office Action mailed Apr. 30, 2008 in European Patent Application No. 03716920.8, filed Mar. 27, 2003.
Office Action mailed Oct. 25, 2011 in Japanese Patent Application 2007-536911 filed Oct. 12, 2005.
Office Action mailed Jul. 24, 2012 in Japanese Patent Application 2007-536911 filed Oct. 12, 2005.
Final Office Action mailed Apr. 1, 2013 in Japanese Patent Application 2007-536911 filed Oct. 12, 2005.
Office Action mailed May 13, 2005 in Chinese Patent Application 1812317.1, filed May 11, 2001.
Office Action mailed Apr. 21, 2006 in Chinese Patent Application 1812317.1, filed May 11, 2001.
Office Action mailed Jul. 19, 2006 in Japanese Patent Application 2003-577155, filed Mar. 11, 2003.
Office Action mailed 2007 in Chinese Patent Application 3805749.2, filed Mar. 11, 2003.
Office Action mailed Feb. 27, 2007 in Japanese Patent Application 2002-590018, filed May 13, 2002.
Office Action mailed Jan. 26, 2007 in Chinese Patent Application 3807018.9, filed Mar. 27, 2003.
Office Action mailed Dec. 7, 2005 in Indian Patent Application 2283/DELNP/2004, filed Mar. 11, 2003.
Office Action mailed Mar. 31, 2009 in European Patent Application 3714080.3, filed Mar. 11, 2003.
Agichtein et al., "Snowball: Extracting Information from Large Plain-Text Collections," ACM DL '00, the Fifth ACM Conference on Digital Libraries, Jun. 2, 2000, San Antonio, TX, USA.
Satake, Masaomi, "Anaphora Resolution for Named Entity Extraction in Japanese Newspaper Articles," Master's Thesis [online], Feb. 15, 2002, School of Information Science, JAIST, Nomi, Ishikaw, Japan.
Office Action mailed Aug. 29, 2006 in Japanese Patent Application 2003-581064, filed Mar. 27, 2003.
Office Action mailed Jan. 26, 2007 in Chinese Patent Application 3807027.8, filed Mar. 28, 2003.
Office Action mailed Jul. 25, 2006 in Japanese Patent Application 2003-581063, filed Mar. 28, 2003.
Huang et al., "A syntax-directed translator with extended domain of locality," Jun. 9, 2006, In Proceedings of the Workshop on Computationally Hard Problems and Joint Inference in Speech and Language Processing, pp. 1-8, New York City, New York, Association for Computational Linguistics.
Melamed et al., "Statistical machine translation by generalized parsing," 2005, Technical Report 05-001, Proteus Project, New York University, http://nlp.cs.nyu.edu/pubs/.
Galley et al., "Scalable Inference and Training of Context-Rich Syntactic Translation Models," Jul. 2006, In Proceedings of the 21st International Conference on Computational Linguistics and 44th Annual Meeting of the ACL, pp. 961-968.
Huang et al., "Statistical syntax-directed translation with extended domain of locality," Jun. 9, 2006, In Proceedings of AMTA, pp. 1-8.

* cited by examiner

GENERATION AND EXPLOITATION OF AN APPROXIMATE LANGUAGE MODEL

CROSS-REFERENCES TO RELATED APPLICATIONS

This nonprovisional U.S. patent application claims the priority benefit of provisional U.S. patent application No. 60/918,435 filed Mar. 16, 2007 and entitled "Generation and Exploitation of Approximate Language Models" which is incorporated by reference herein.

BACKGROUND

1. Field of Invention

The present invention relates generally to natural language processing and more specifically to natural language processing applications that use a language model.

2. Description of Related Art

In machine translation, a language model is often used to estimate the correctness of a translated text in a target language. In statistical machine translation, the language model typically assigns a high probability to a grammatically correct sentence and a low probability to a grammatically incorrect sentence. For example, a language model will assign a high probability to the sequence, "Mary has a little lamb" and a low probability to the sequence "Mary little lamb a has."

Typically, language models include a stochastic generative process that produces structures (e.g., sentences) that are either well-formed or ill-formed. The stochastic generative process typically generates the structures in a sequence of steps where each step is associated with a probability. The probability of the entire structure is calculated by multiplying the probability of all of the steps.

For example, a language model can be generated by choosing a first word in the sentence, choosing other words in the sentence and choosing a last word in the sentence. The first word in the sentence is associated with a probability of $p(w_1|BOS)$ where BOS is the Beginning of the Sentence. The other words in the sentence are associated with a probability $p(w_i|w_{i-1})$. The last word in the sentence is associated with a probability $p(EOS|w_n)$ where EOS is the End of the Sentence. $P(x|y)$ is a conditional probability or how likely it is that x follows word y. The probabilities are typically estimated from a large corpus in the target language.

Continuing the "Mary has a little lamb" example, the sentence "mary has a little lamb" receives the probability $p(mary|BOS) \times p(has|mary) \times p(a|has) \times p(little|a) \times p(lamb|little) \times p(EOS|lamb)$. Because the bigram conditional probabilities reflect that the sequence "Mary has a little lamb" is more likely than those in the sequence, "Mary little lamb a has," the sequence "Mary has a little lamb" will be selected by a machine translator.

Figure 1:
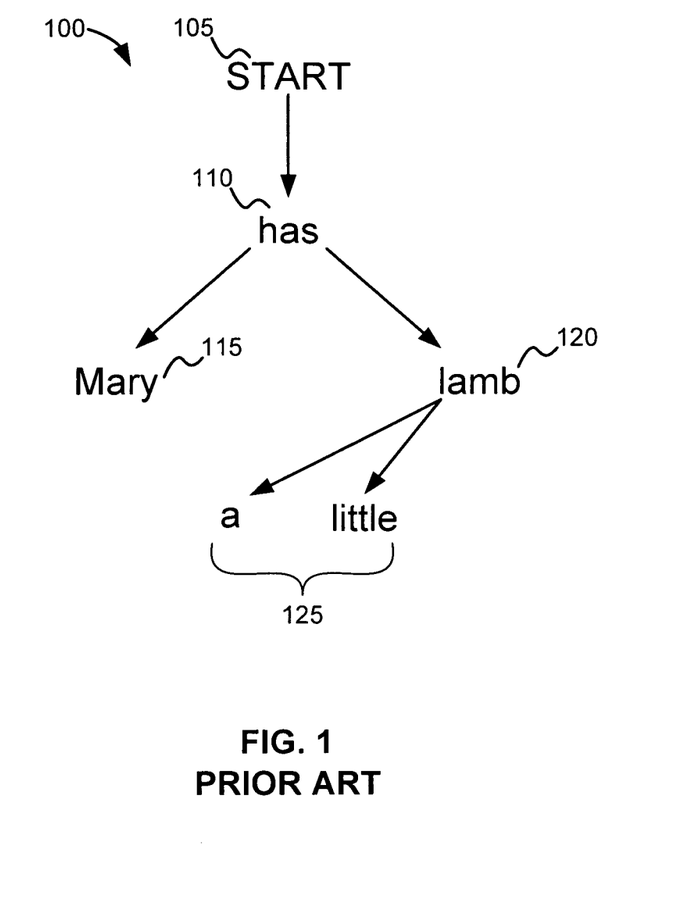
FIG. 1 is an exemplary depiction of a tree structure used to generate a sentence according to the prior art.

Another example of a language model is a dependency-based language model where a sentence is generated using a tree structure. FIG. 1 is an exemplary depiction of a tree structure 100 used to generate a sentence. From an invisible START symbol 105, the language model generates the head word 110 of the tree "has" with probability p(has|START). The language model then generates left modifiers 115 (i.e., "Mary") and right modifiers 120 (i.e., "lamb") with probabilities p_left(mary|has)×p_right(lamb), respectively. Finally, the left modifiers 125 (i.e., "a" and "little") of "lamb" with probabilities p_left(a|lamb)×p_left(little|lamb) are generated.

To be used in machine translation, the language model is stored in a random access memory (RAM). For a bi-gram language model, such as those described herein, four pieces of information are generally stored in RAM. First, the history of the word, or preceding context on which the decision to use the word was made, is stored. Next, the word (i.e., event) that was generated based on the history is stored. Third, the conditional probability of generating the word given the history is stored. The conditional probability is expressed as a floating point value. Finally, some back-off values that enable one to estimate probabilities of events that have not been seen in the training data are stored.

If a language model becomes too large (e.g., tens of billions or trillions of words), the amount of RAM required to store the language model becomes prohibitive.

SUMMARY OF THE INVENTION

A system, method, and computer program for generating and exploiting an approximate language model are provided. The method comprises generating a language model according to an approximate hashing technique. The language model comprises a plurality of event sequences in a target language, and each member of the plurality of the event sequences is associated with at least one count. The language model is queried for a member of the plurality of event sequences. A probability associated with the member of the plurality of event sequences is determined based on results of the query.

DETAILED DESCRIPTION

An approximate language model using approximate hashing to load a language model into a RAM is provided. The approximate language model comprises a table which pairs a language model event sequence (e.g., word sequence, word dependency sequence, part of speech sequence, etc.) appearing in training data to a numerical value. The numerical value may indicate a count, a probability, a score, or the like. The approximate language model decreases the amount of data that is loaded into a random access memory (RAM). However, the use of approximate hashing techniques may cause the language model to return inaccurate results.

Approximate hashing may be used to store and query an approximate language model while reducing the amount of data loaded into the RAM of a computer or other machine performing machine translation, speech recognition, and/or other natural language processing applications. Approximate hashing may compactly represent the language model in RAM not storing the history and word/event information.

Approximate hashing may be performed by generating one or more hash tables using separate hash functions. For example, a key corresponding to a single input string, when input into a data structure using approximate hashing, is processed using each of the hash functions. The key may return a value for each of the hash functions based on the hash tables associated with the hash function. Each value may be a quantized language model probability. Thus, approximate hashing further involves determining, through selection and/or aggregation of the returned values, a single result. The single result may comprise one or more values.

Figure 2:
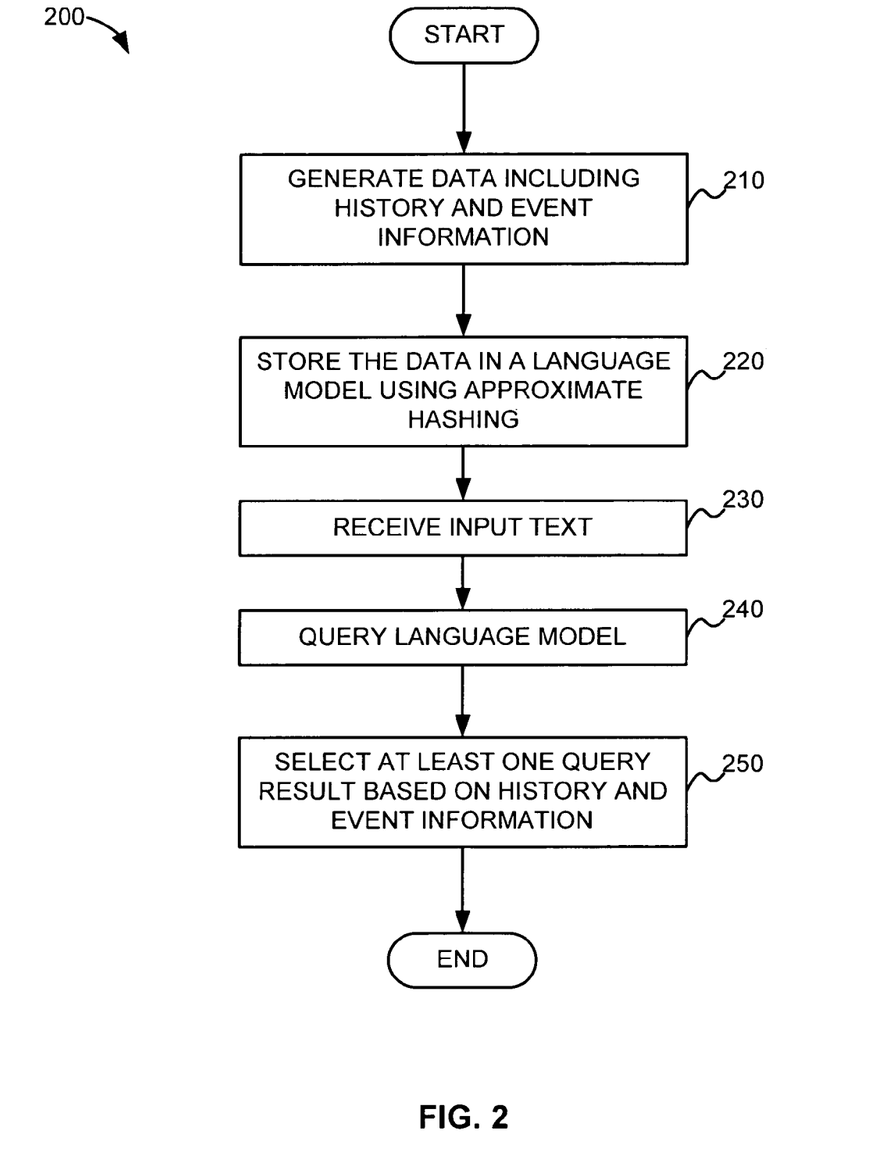
FIG. 2 is a flowchart of an exemplary method for generating and exploiting an approximate language model according to some embodiments.

FIG. 2 is a flowchart of an exemplary method 200 for generating and exploiting an approximate language model according to some embodiments. The method 200 may be performed by a digital device as described in connection with FIG. 6.

In a step 210, data including history and event information is generated. The data may be generated from, for example, a known language model, a parallel corpus, a monolingual corpus, or the like. The data includes a list of unique tuples which indicate history, event, and count information of a word of interest. History information is the context in which the word of interest appears, e.g., the word occurring just before the word of interest. Event information identifies the word of interest itself. The history information and the event information combined may be referred to as an "event sequence." Count information is the number of times the history and event have occurred. The tuples may be generated according to techniques known to those skilled the art.

In a step 220, the data is stored in a language model using an approximate hashing technique. Approximate hashing techniques include techniques employing data structures such as: spectral Bloom filters, Bloom filter replacements, dynamic Bloom filters, weighted Bloom filters, d-left counting Bloom filters, parallel Bloom filters, hierarchical Bloom filter arrays, stable Bloom filters, dynamic count filters, Bloomier filters, compact approximators, generalized Bloom filters, attenuated Bloom filters, compressed Bloom filters, perfect hashing, or the like.

In some embodiments, the approximate language model comprises a set of data structures organized in a hierarchy. The hierarchy may be ranked based on the number of occurrences of a language model event sequence in the training data. In the hierarchy, the lower levels, corresponding to the event sequences occurring least frequently, may be stored using fewer bits while the higher levels, corresponding to the word sequences occurring most frequently, are stored using more bits. Thus, once multiple values are selected based on a key and more than one hashing function, the hierarchy may determine the result. In exemplary embodiments, the result appearing in the highest ranked data structure containing a value corresponding to the key is returned. An example of using spectral bloom filters organized in a hierarchy is discussed in greater detail in connection with FIGS. 3-4B.

In a step 230, input text is received. The input text is typically an initial translation in a target language of text in a source language. The initial translation may be generated using a statistical machine translation technique.

In a step 240, the language model is queried. The type of query used depends on the approximate hashing technique used to generate the language model as will be apparent to those skilled in the art of approximate hashing techniques. An exemplary query technique based on spectral bloom filters is discussed in connection with FIG. 5. The results of the query include counts of the number of occurrences of the history with the event and the number of occurrences of the history. If either of the counts is zero, the method 200 may back-off to shorter histories (i.e., histories having fewer words) and employ a back-off factor or a range of back-off factors that depend on the length of the history. The back-off factors may be tuned automatically depending on a final evaluation criterion using standard techniques.

In a step 250, at least one query result is selected based on history and event information. The probability of the event is calculated by dividing the count of the number of occurrences of the history with the event by the number of occurrences of the history. Typically, the query result having the highest probability of the event is selected.

Figure 3:
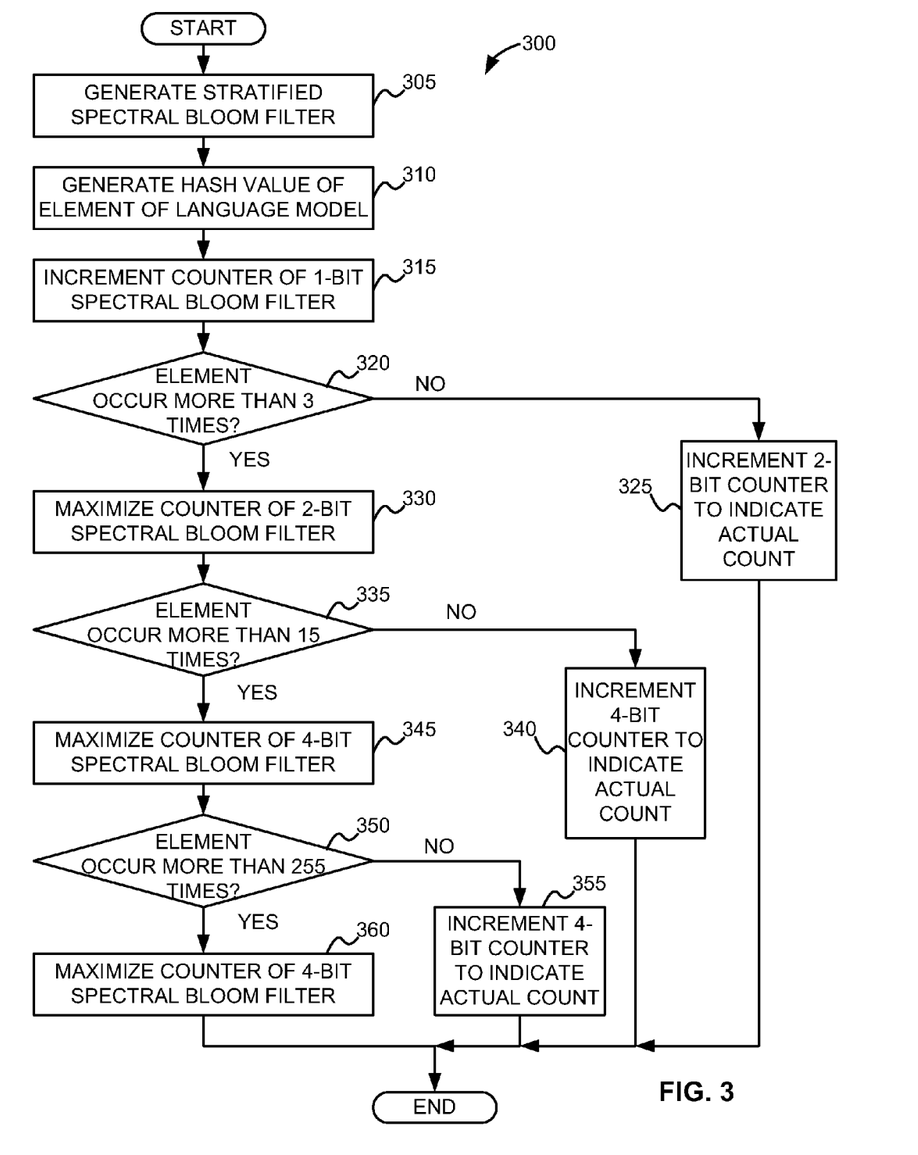
FIG. 3 is a flowchart of a method for generating an approximate language model according to some embodiments.
Figure 4A:
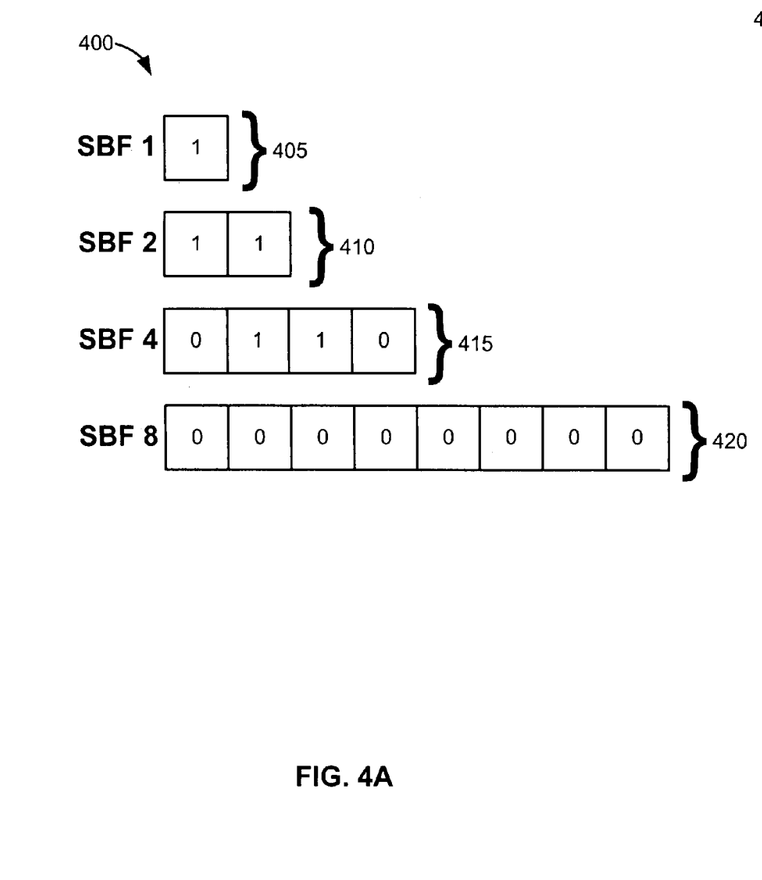
FIG. 4A is a stratified spectral bloom filter according to various embodiments.

FIG. 3 is a flowchart of a method 300 for generating an approximate language model according to some embodiments. The approximate language model generated by the method 300 is generated using a stratified spectral bloom filter. As will be apparent, other approximate hashing techniques may be used. As will be apparent to those skilled in the art, the method 300, which includes four Spectral Bloom filters (SBF), may be modified to accommodate any number of Spectral Bloom filters within the SSBF 400. The method 300 may be performed by a digital device as described in connection with FIG. 6.

In a step 305, a stratified spectral bloom filter (SSBF) is generated. The SSBF includes one or more Spectral Bloom filters. In some embodiments, the SSBF includes six Spectral Bloom filters. The Spectral Bloom filter comprises a space-efficient probabilistic data structure that is used to test whether an element is a member of a set. An empty Spectral Bloom filter comprises a bit vector of m counters, C, representing the multiplicities of items, all set to 0. A Spectral Bloom filter comes with k different hash functions, each of which maps a key value to one of the m array positions. To add an element s to the Spectral Bloom filter, the counters $C_{h1(s)}$, $C_{h2(s)}$, ..., and $C_{hk(s)}$ are increased by 1. To query for an element s (determine how often it occurred), s is fed to each of the k hash functions to get the values of the counters $C_{h1(s)}$, $C_{h2(s)}$, ..., and $C_{hk(s)}$. The counter of minimal value is returned. When adding an element s, only the counters equal to $m_x$, the minimal counter, may be increased. When performing a lookup query, $m_x$ is returned. For inserting c occurrences of an element, the smallest counters are increased by c and every other counter is set to the maximal of their previous value and $m_x+c$.

An SSBF is a hierarchy of Spectral Bloom filters. The lower levels of the hierarchy store the counts of the elements s that occur very rarely in a multiset S (i.e., the generated data of step 210). The higher levels of the hierarchy store the counts of the elements s that occur very frequently in the multiset S. To save space, the Spectral Bloom filters at the lower level use fewer bits per count than the Spectral Bloom filters at the higher level.

The hierarchy may include any number of Spectral Bloom filters depending on the size of the bit counters. Each $SBF_I$ uses a set of hash functions $h_{I,1}, h_{I,2}, \ldots, h_{I,k}$. Each Spectral Bloom filter uses the same number of hash functions, but the hash functions are distinct to minimize collisions.

FIG. 4A is a stratified spectral bloom filter 400 according to various embodiments. The SSBF 400 includes four Spectral Bloom filters. The first Spectral Bloom filter $SBF_1$ 405 uses bit counters of size 1. The second Spectral Bloom filter $SBF_2$ 410 uses bit counters of size 2. The third Spectral Bloom filter $SBF_4$ 415 uses bit counters of size 4. The fourth Spectral Bloom filter $SBF_8$ 420 uses bit counters of size 8. As will be apparent to those skilled in the art, the number of bits in each counter may be varied. As will be discussed further herein, the counters depicted in FIG. 4A indicate that an element s occurs six times.

Returning to FIG. 3, in a step 310, at least one hash value is calculated based on an element s (i.e., event) in the set S (i.e., the data generated in step 210). The hash values are calculated using hash functions as will be apparent to those skilled in the art. Because multiple hash functions may be used for each element s, the element s is associated with more than one hash value and, thus, more than one counter $C_{h1,1(s)}, C_{h1,2(s)}, \ldots$, and $C_{h1,k(s)}$, where k is the number of hash functions used.

In a step 315, the counters are incremented by adding elements s to the SSBF. Referring to FIG. 4A, for any element s from S, the one-bit counters $C_{h1,1(s)}, C_{h1,2(s)}, \ldots$, and $C_{h1,k(s)}$ corresponding to each hash function are set to 1 in SBF 1 405 if s occurs at least once in S.

In a step 320, a determination is made as to whether the element s occurs more than three times. If the element s does not occur more than three times, the two-bit counter in $SBF_2$ is incremented to indicate the actual count, in a step 325. If, however, the element s occurs more than three times, the counters $C_{h2,1(s)}, C_{h2,2(s)}, \ldots$, and $C_{h2,k(s)}$ corresponding to each hash function are set to the maximum value in $SBF_2$ (i.e., three), in step 330. Thus the counter in $SBF_2$ is set to the minimum of the count and three, the maximum count that can be stored by the two-bit counter. Referring to FIG. 4A, because the element s occurs more than three times, the counter of SBF 2 410 is set to the maximum amount of three.

In a step 335, a determination is made as to whether the element s occurs more than fifteen times, the maximum count that can be stored in a four-bit counter. If the element s does not occur more than fifteen times, the four-bit counter in $SBF_3$ is incremented to indicate the actual count, in a step 340. Referring to FIG. 4A, because the element s occurs six times, the counter of SBF 4 410 is set to the binary number 0110, or six. If, however, the element s occurs more than fifteen times, the counters $C_{h4,1(s)}, C_{h4,2(s)}, \ldots$, and $C_{h4,k(s)}$ corresponding to each hash function are set to the maximum value in $SBF_4$ (i.e., fifteen), in step 330. Thus the counter in $SBF_4$ is set to the minimum of the count and fifteen, the maximum count that can be stored by the four-bit counter.

In a step 350, a determination is made as to whether the element s occurs more than 255 times, the maximum count that can be stored in an eight-bit counter. If the element s does not occur more than 255 times, the eight-bit counter in $SBF_8$ is incremented to indicate the actual count in a step 355. If, however, the element s occurs more than 255 times, the counters $C_{h8,1(s)}, C_{h8,2(s)}, \ldots$, and $C_{h8,k(s)}$ corresponding to each hash function are set to the maximum value in $SBF_8$ (i.e., 255), in step 360. Thus the counter in $SBF_8$ is set to the minimum of the count and fifteen, the maximum count that can be stored by the four-bit counter.

Figure 4B:
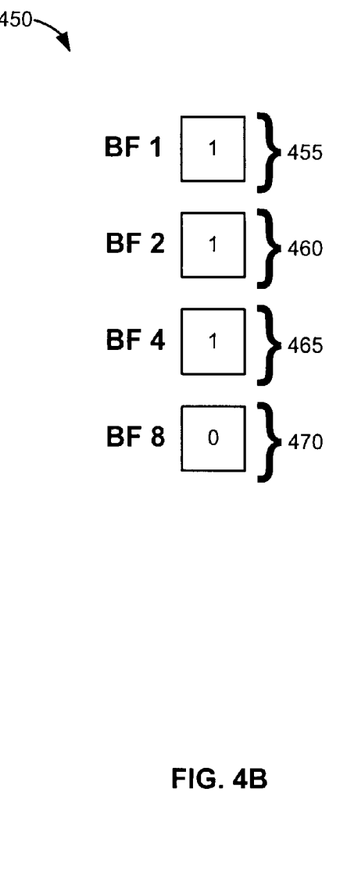
FIG. 4B is a condensed version of the stratified spectral bloom filter according to some embodiments.

FIG. 4B is a condensed version 450 of the stratified spectral bloom filter 400 according to some embodiments. Once an SSBF-based language model is computed, it can be further compacted by keeping at each SBF level only a simple, 1-bit Bloom filter, indicating whether the count is stored in the Spectral Bloom filter at that level. For example, a count is at the level 3 in the SSBF simply indicates that the count has a value between four and fifteen. To quantize the counts, the average of the values stored at each level may be used.

As depicted in FIG. 4B, Bloom filter (BF) 1 455 is set to one to indicate that the element s occurs at least once. BF 2 460 is also set to one, indicating that element occurs at least two to three times. BF 4 465 is also set to one, indicating that element s occurs at least four to fifteen times. BF 8 470 is set to zero, indicating that element s does not occur at least sixteen times. Thus, the condensed version 450 indicates that the count for element s is between four and fifteen.

To use SSBFs to store a language model, a vector of several SSBFs is generated. To illustrate, a first SSBF, SSBF[1], stores all empty histories and one-word events, for a total key size of 1 (history size of zero+one extra word). A second SSBF, SSBF[2], stores all histories of length 1 and one-word events, for a total key size of 2 (history size of one+one extra word). A final SSBF, SSBF[n], stores all histories of length n–1 and one-word events, for a total key size of n. For example, a five-gram language model has one SSBF that stores all unigram counts; one SSBF that stores all bigram counts; one SSBF that stores all trigram counts; one SSBF that stores all four-gram counts; and one SSBF that stores all five-gram counts.

In one instance, given the counts associated with each event, one-count events can be stored as one bit; two- and three-count events can be stored as two bits; and so forth for four, eight, sixteen, and thirty-two bits. On the basis of this computation and a pre-defined error rate, the number of bits used at each level in an SSBF data structure is calculated. For example, from a corpus of 10M sentences, the counts of all trigrams in the corpus are calculated. In the corpus, there are 50,322,804 trigrams that occur one or more times; 20,983,262 trigrams whose counts fit in two or more bits; 8,624,766 trigrams whose count fit into four or more bits; 1,809187 trigrams whose count fit into eight or more bits; 90,250 trigrams whose count fit into sixteen or more bits; and 36 trigrams whose count fit into thirty-two bits. Assuming that bit arrays eight times larger than the number of keys they store are used and six hash key functions are used per SBF, which corresponds to an error rate of approximately two percent, it follows that all the counts for all trigrams can be stored in an SSBF of 136.096 MB. Further, as will be apparent to those skilled in the art, the counts of all unigrams, bigrams, trigrams, four-grams, and five-grams extracted from the same 10M line corpus can be stored in five SSBFs that require a total of 635.931 MB. When the language model is condensed, as described in connection with FIG. 4B, the approximate counts of all the trigrams in the corpus example can be stored in 80.02 MB.

Figure 5:
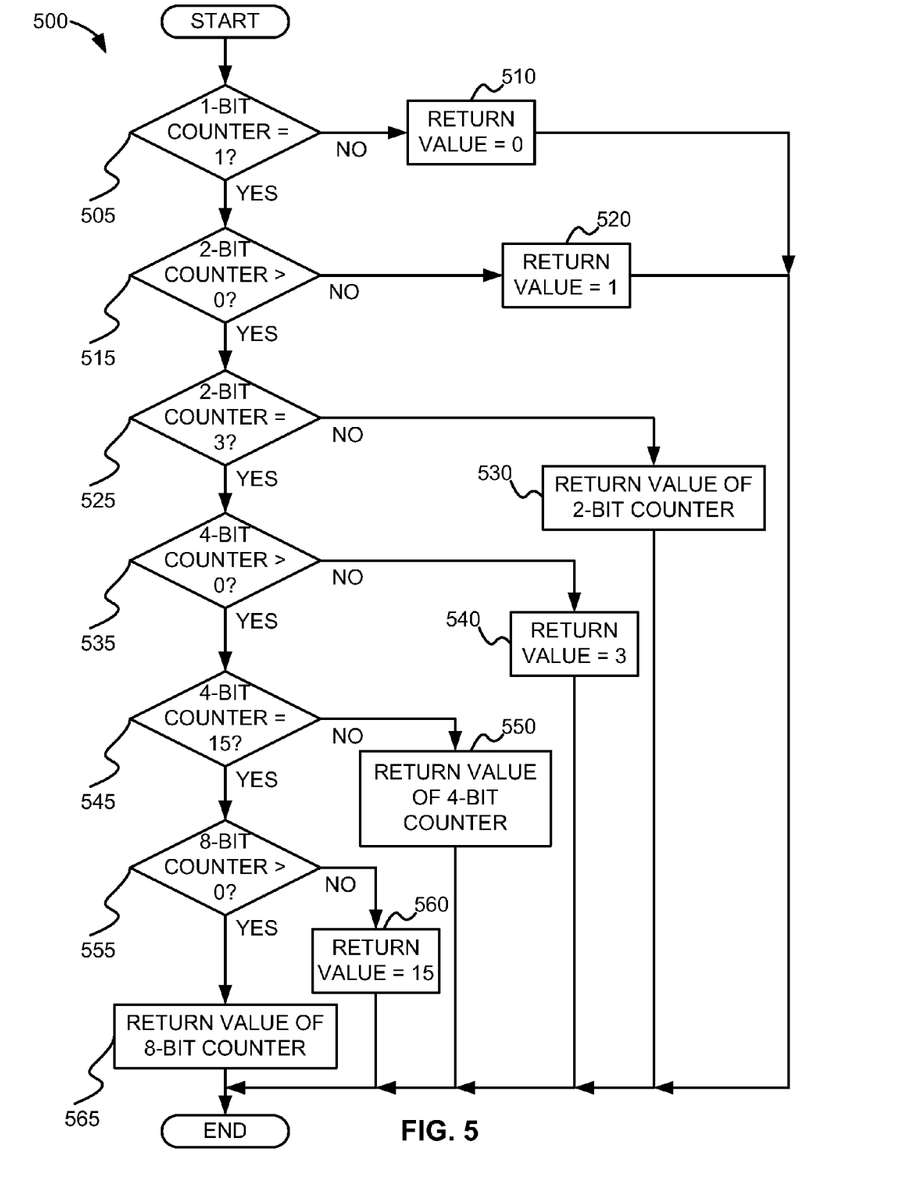
FIG. 5 is a flowchart of a method for querying a Stratified Spectral Bloom filter for determining a count according to various embodiments.

FIG. 5 is a flowchart of a method 500 for querying an SSBF, such as SSBF 400, to determine a count according to various embodiments. The method 500 traverses the SSBF from the low bit counters to the high-bit counters and returns the counter having the minimum value. While the method 500 describes an SSBF having counters of one, two, four, and eight bits, it will be apparent to those skilled in the art that the method 500 may be modified to accommodate an SSBF having counters of any size. The method 500 is repeated for each hash function used to generate the SSBF.

In a step 505, a determination is made as to whether the one-bit counter stores a value equal to one. If the one-bit counter stores a value of zero, the query results in returning a value of zero in a step 510, indicating that the element s does not exist in the language model.

In a step 515, if the one-bit counter stores a value equal to one, another determination is made as to whether the two-bit counter (or another higher bit counter) stores a value greater than zero. In a step 520, if the two-bit counter stores a value of zero, the method 500 returns the highest count from the lower-bit counter, in this case, one.

In a step 525, if the two-bit counter stores a non-zero value, a determination is made as to whether the two-bit counter stores a value equal to the maximum count that can be stored by the counter, in this case, three. If the two-bit counter does not store a value equal to three, the value stored in the two-bit counter is returned, in a step 530.

In a step 535, if the two-bit counter stores a value equal to three, another determination is made as to whether the next higher bit counter, in this instance, a four-bit counter, stores a value greater than zero. In a step 540, if the four-bit counter stores a value of zero, the method 500 returns the highest count from the lower-bit counter, in this case, three.

In a step 545, if the four-bit counter stores a non-zero value, a determination is made as to whether the four-bit counter stores a value equal to the maximum count that can be stored by the counter, in this case, fifteen. If the four-bit counter does not store a value equal to fifteen, the value stored in the four-bit counter is returned, in a step 550.

In a step 555, if the four-bit counter stores a value equal to fifteen, another determination is made as to whether the next higher bit counter, in this instance, an eight-bit counter, stores a value greater than zero. In a step 560, if the eight-bit counter stores a value of zero, the method 500 returns the highest count from the lower-bit counter, in this case, fifteen.

In a step 565, if the eight-bit counter stores a non-zero value, the value of the eight-bit counter is returned. Because the SSBF in this example contains a highest counter of eight bits, the maximum count that can be stored is 255. It is understood that SSBFs having counters containing more bits may be used to achieve higher counts.

After the counts for each history and event are determined the probabilities associated with each can be calculated to select a query result, as described in connection with steps 240 and 250 of FIG. 2.

Figure 6:
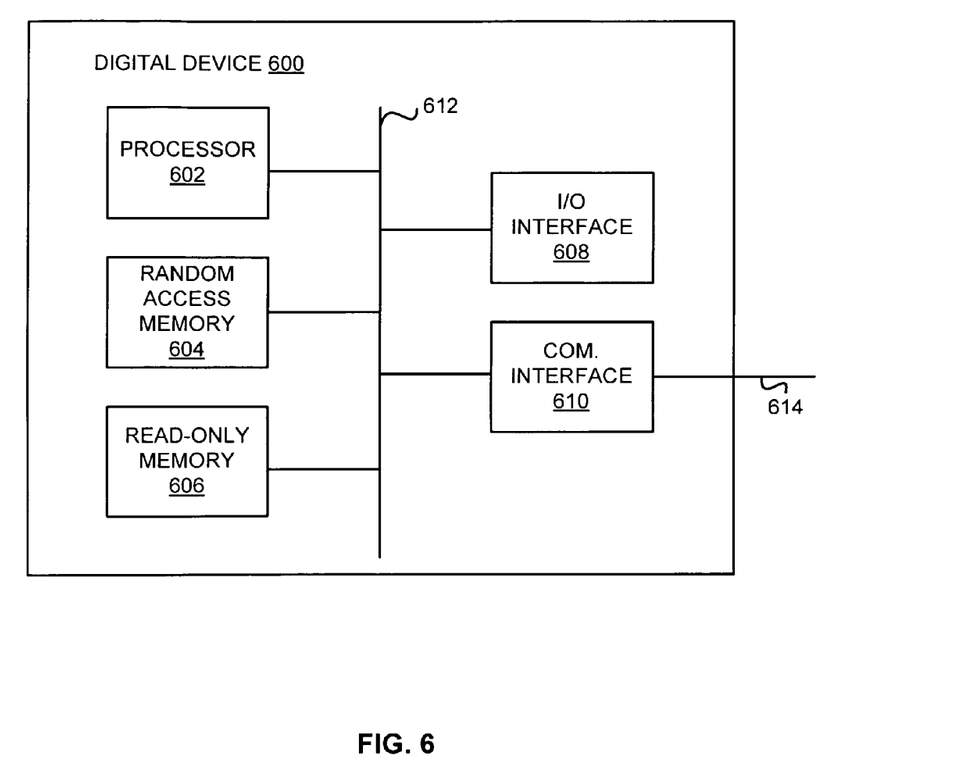
FIG. 6 is a diagram of a digital device according to various embodiments.

FIG. 6 is a diagram of a digital device according to various embodiments. The digital device 600 comprises a processor 602, a random access memory 604, a read-only memory 606, an input/output ("I/O") interface 608, a communication network interface 610 which are all coupled to a system bus 612. The processor 602 is configured to execute executable instructions. In some embodiments, the processor 602 comprises one or more circuits and/or multiple computation devices capable of processing the executable instructions.

The random access memory 604 is a memory configured to store data such that it can be accessed quickly. Some examples of the random access memory 604 include RAM, or flash memory. The read-only memory 606 is any storage configured to persistently store data (e.g., static memory) but is accessed sequentially. Some examples of the read-only memory 606 include, but are not limited to, flash drives, hard drives, optical drives, and/or magnetic tape. Computer readable medium may comprise all or some of the random access memory 604, the read-only memory 606, or a combination of the random access memory 604 and the read-only memory 606.

The I/O interface 608 is any device that can receive input from or deliver output to a system administrator or a user. The I/O interface 608 can couple to a keyboard, display, mouse, keypad, printer, scanner, or any other input or output device.

The communication network interface 610 is configured to couple to a communication network such as a local area network (LAN), wide area network (WAN), the Internet, or the like via the coupling 614. Moreover, the communication network interface 610 may support communication over many kinds of connections, including, but not limited to, a USB connection, a firewire connection, an Ethernet connection, a serial connection, and/or a parallel connection. The communication network interface 610 may also support wireless communication (e.g., 802.11a/b/g/n or wireless USB). It will be apparent to those skilled in the art that the communication network interface 610 can support many wired and wireless standards.

The above-described modules can be comprised of instructions that are stored on computer-readable storage media. The instructions can be retrieved and executed by the processor 602. Some examples of instructions include software, program code, and firmware. Some examples of storage media comprise memory devices and integrated circuits. The instructions are operational when executed by the processor 602 to direct the processor 602 to operate in accordance with embodiments of the present invention. Those skilled in the art are familiar with instructions, processor(s), and storage media.

While various embodiments have been described above, it should be understood that they have been presented by way of example only, and not limitation. Thus, the breadth and scope of a preferred embodiment should not be limited by any of the above-described exemplary embodiments.

What is claimed is:

1. A method comprising:
    executing instructions via a processor of a computing system for:
        generating a language model according to an approximate hashing technique, the language model comprising a plurality of event sequences in a target language, each member of the plurality of the event sequences associated with at least one count, the language model comprising a set of data structures organized in a hierarchy with lower levels corresponding to event sequences occurring less frequently being stored using fewer bits, the hierarchy having three or more levels;
        querying the language model for a member of the plurality of event sequences; and
        determining a probability associated with the member of the plurality of event sequences based on results of the query.

2. The method of claim 1, wherein the approximate hashing technique uses a plurality of hash functions.

3. The method of claim 1, wherein the approximate hashing technique comprises generating a Stratified Spectral Bloom filter comprising a plurality of levels, each of the levels including a Spectral Bloom filter.

4. The method of claim 3, wherein the at least one count is indicated within each of the levels based on a minimal counter.

5. The method of claim 3, wherein an approximation of the at least one count is indicated within each of the levels using one bit.

6. The method of claim 1, wherein the language model includes a number of Stratified Spectral Bloom filters, the number based on a length of the event sequences.

7. The method of claim 1, wherein the event sequence comprises history information and event information.

8. The method of claim 1, wherein determining the probability is based on a first value associated with event information and a second value associated with history information.

9. The method of claim 1, wherein the approximate hashing technique comprises a filter selected from a group consisting of: Bloom filter replacements, dynamic Bloom filters, weighted Bloom filters, d-left counting Bloom filters, parallel Bloom filters, hierarchical Bloom filter arrays, stable Bloom filters, dynamic count filters, Bloomier filters, compact approximators, generalized Bloom filters, attenuated Bloom filters, perfect hash keys, and compressed Bloom filters.

10. A system comprising:
    a processor configured to generate a language model based on a training corpus using an approximate hashing technique, the language model comprising a set of data structures organized in a hierarchy with lower levels corresponding to event sequences occurring less frequently being stored using fewer bits, the hierarchy having three or more levels; and a memory configured to store the language model.

11. The system of claim 10, wherein the language model comprises a plurality of Stratified Spectral Bloom filters.

12. The system of claim 11, wherein the approximate hashing technique includes a plurality of hash functions.

13. The system of claim 10, wherein the memory comprises a random access memory.

14. The system of claim 10, wherein the size of the language model is less than six hundred fifty megabytes for a portion of a training corpus comprising ten million sentences.

15. The system of claim 10, wherein the processor is further configured to query the language model based on an initial sequence.

16. The system of claim 10, wherein the approximate hashing technique comprises generating a Stratified Spectral Bloom filter comprising a plurality of levels, each of the levels including a Spectral Bloom filter.

17. The system of claim 16, wherein a count corresponding to an event sequence within the language model is indicated within each of the levels based on a minimal counter.

18. The system of claim 16, wherein the count is indicated within each of the levels using one bit.

19. The system of claim 18, wherein the size of the language model is less than one hundred megabytes for a portion of a training corpus comprising ten million sentences.

20. A non-transitory computer readable storage medium having embodied thereon a program, the program being executable by a processor for performing a method for determining a translation, the method comprising:

generating a language model according to an approximate hashing technique, the language model comprising a plurality of event sequences in a target language, each member of the plurality of the event sequences associated with at least one count, the language model comprising a set of data structures organized in a hierarchy with lower levels corresponding to event sequences occurring less frequently being stored using fewer bits, the hierarchy having three or more levels;

querying the language model for a member of the plurality of event sequences; and determining a probability associated with the member of the plurality of event sequences based on results of the query.

* * * * *